United States Patent
Kuo

(10) Patent No.: US 10,928,502 B2
(45) Date of Patent: Feb. 23, 2021

(54) METHODS AND APPARATUS FOR DETECTING PRESENCE OF AN OBJECT IN AN ENVIRONMENT

(71) Applicant: Richwave Technology Corp., Taipei (TW)

(72) Inventor: Sheng Chung Kuo, Taipei (TW)

(73) Assignee: RICHWAVE TECHNOLOGY CORP., Taipei (TW)

( * ) Notice: Subject to any disclaimer, the term of this patent is extended or adjusted under 35 U.S.C. 154(b) by 272 days.

(21) Appl. No.: 15/993,574

(22) Filed: May 30, 2018

(65) Prior Publication Data

US 2019/0369224 A1    Dec. 5, 2019

(51) Int. Cl.
     *G01S 13/56*      (2006.01)

(52) U.S. Cl.
     CPC ................... *G01S 13/56* (2013.01)

(58) Field of Classification Search
     CPC ....................................... G01S 13/56
     USPC ............................................. 342/28
     See application file for complete search history.

(56) References Cited

U.S. PATENT DOCUMENTS

| | | | |
|---|---|---|---|
| 3,932,870 A | 1/1976 | Shapiro et al. | |
| 4,187,501 A | 2/1980 | Olesch et al. | |
| 8,018,371 B1 * | 9/2011 | Paschen | G01S 13/04 342/90 |
| 9,229,102 B1 | 1/2016 | Wright et al. | |
| 2005/0078029 A1 | 4/2005 | Okamura et al. | |
| 2009/0154726 A1 * | 6/2009 | Taenzer | G10L 25/78 381/94.1 |
| 2011/0148689 A1 * | 6/2011 | Filippi | G01S 13/886 342/28 |
| 2011/0267222 A1 * | 11/2011 | Craig | G01S 3/30 342/25 B |
| 2013/0041856 A1 | 2/2013 | Benitez et al. | |

(Continued)

FOREIGN PATENT DOCUMENTS

| | | |
|---|---|---|
| CN | 101414005 A | 4/2009 |
| CN | 102007428 A | 4/2011 |

(Continued)

OTHER PUBLICATIONS

European Patent Office, European Search Report of Application No. EP19177157, dated Oct. 17, 2019.

(Continued)

*Primary Examiner* — Frank J McGue
(74) *Attorney, Agent, or Firm* — Finnegan, Henderson, Farabow, Garrett & Dunner L.L.P

(57) ABSTRACT

Methods and apparatus for detecting presence of an object in an environment, the method including receiving a Doppler signal during a frame, filtering the Doppler signal in a frequency band, determining a signal energy of the filtered Doppler signal in time domain, determining whether motion of the object is detected in accordance with the Doppler signal and a baseline energy, responsive to a determination that motion of the object is detected in accordance with the signal energy and the baseline energy, setting a flag of object presence, and responsive to a determination that motion of the object is not detected in accordance with the Doppler signal, updating the baseline energy in accordance with the signal energy.

20 Claims, 8 Drawing Sheets

(56) References Cited

U.S. PATENT DOCUMENTS

| | | | |
|---|---|---|---|
| 2013/0307562 A1* | 11/2013 | Chen | G01S 7/352 |
| | | | 324/637 |
| 2014/0070983 A1 | 3/2014 | Maalouli et al. | |
| 2015/0301167 A1 | 10/2015 | Sentelle et al. | |
| 2016/0124084 A1 | 5/2016 | Lim et al. | |
| 2016/0307418 A1 | 10/2016 | Pantus et al. | |
| 2017/0123058 A1 | 5/2017 | Yavari et al. | |
| 2019/0317191 A1 | 10/2019 | Santra et al. | |
| 2020/0003864 A1 | 1/2020 | Chi | |

FOREIGN PATENT DOCUMENTS

| | | |
|---|---|---|
| CN | 103109201 A | 5/2013 |
| EP | 0945854 A2 | 9/1999 |
| EP | 2940486 A1 | 11/2015 |
| TW | 201042961 A | 12/2010 |
| TW | 201711502 A | 3/2017 |

OTHER PUBLICATIONS

Office Action issued by the USPTO dated Aug. 5, 2020, for U.S. Appl. No. 15/993,585.

* cited by examiner

METHODS AND APPARATUS FOR DETECTING PRESENCE OF AN OBJECT IN AN ENVIRONMENT

TECHNICAL FIELD

The present disclosure relates to detecting presence of an object, and more particularly, to methods and apparatus for detecting presence of an object in an environment.

BACKGROUND

Detecting presence of an object in an environment can be applied to various applications, such as smart home devices and systems, and home security and surveillance. Motion sensors and proximity sensors can be used to detect the presence of the object. For example, passive infrared (PIR) sensors can be used to detect whether a human has moved in or out of a sensor's range. However, motion sensors and proximity sensors may not be able to provide accurate and/or prompt presence detection of a variety of objects, such as an inanimate object, a human, or an animal. In addition, motion sensors and proximity sensors may not be applicable to a variety of environments, such as a large room, an open space office, a public space, or an outdoor environment.

SUMMARY

Embodiments of the present application provide improved methods and apparatus for detecting presence of an object in an environment.

These embodiments include a method for detecting presence of an object in an environment. The method includes receiving a Doppler signal during a frame; filtering the Doppler signal in a frequency band; determining a signal energy of the filtered Doppler signal in time domain; determining whether motion of the object is detected in accordance with the Doppler signal and a baseline energy; responsive to a determination that motion of the object is detected in accordance with the signal energy and the baseline energy, setting a flag of object presence; and responsive to a determination that motion of the object is not detected in accordance with the Doppler signal, updating the baseline energy in accordance with the signal energy.

These embodiments also include an apparatus for detecting presence of an object in an environment. The apparatus includes a memory storing instructions and a processor configured to execute the instructions to cause the apparatus to: receive a Doppler signal during a frame; filter the Doppler signal in a frequency band; determine a signal energy of the filtered Doppler signal in time domain; determine whether motion of the object is detected in accordance with the Doppler signal and a baseline energy; responsive to a determination that motion of the object is detected in accordance with the signal energy and the baseline energy, set a flag of object presence; and responsive to a determination that motion of the object is not detected in accordance with the Doppler signal, update the baseline energy in accordance with the signal energy.

These embodiments further include a non-transitory processor-readable medium storing instructions that are executable by one or more processors of an apparatus to perform a method for detecting presence of an object in an environment. The method includes receiving a Doppler signal during a frame; filtering the Doppler signal in a frequency band; determining a signal energy of the filtered Doppler signal in time domain; determining whether motion of the object is detected in accordance with the Doppler signal and a baseline energy; responsive to a determination that motion of the object is detected in accordance with the signal energy and the baseline energy, setting a flag of object presence; and responsive to a determination that motion of the object is not detected in accordance with the Doppler signal, updating the baseline energy in accordance with the signal energy.

It is to be understood that the foregoing general description and the following detailed description are exemplary and explanatory only, and are not restrictive of the invention, as claimed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
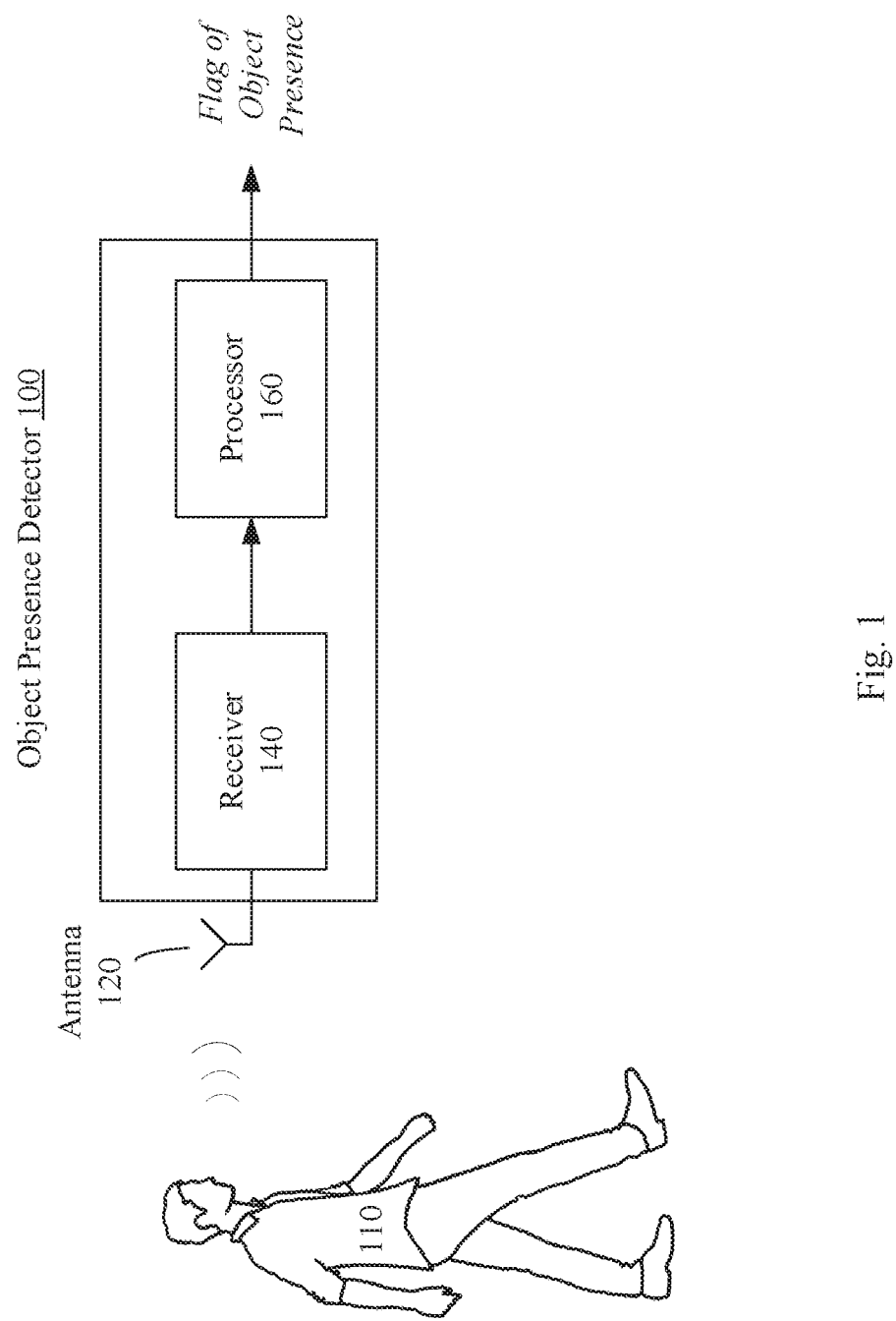
FIG. 1 illustrates an exemplary scenario of detecting presence of an object, according to some embodiments of the present disclosure.

FIG. 1 illustrates an exemplary scenario of detecting presence of an object, according to some embodiments of the present disclosure. For example, as shown in FIG. 1, an object presence detector 100 detects presence of a person 110 in an environment. Object presence detector 100 includes an antenna 120, a receiver 140, and a processor 160. Antenna 120 is configured to receive electromagnetic waves or signals in the environment. Receiver 140 is configured to process the received waves or signals from antenna 120 for presence detection of an object. For example, receiver 140 samples the received waves or signals from antenna 120 in accordance with a sampling rate, converts sampled signals to baseband signals, and feeds the baseband signals to processor 160. Processor 160 is configured to perform methods for detecting presence of an object. For example, processor 160 performs time-domain and/or frequency-domain methods for detecting presence of an object in accordance with the baseband signals from receiver 140.

External motion of person 110 may cause waves or signals reflected from moving person 110 to experience a frequency shift that is related to a radial component of velocity of person 110. External motion of person 110 is defined as any change in a pose or position of person 110's body center of mass (BCOM). This includes all external motion due to walking. For example, when person 110 walks in the environment in FIG. 1, antenna 120 can receive signals reflected from person 110 that experience a Doppler frequency shift because of the motion, e.g., gait, of person 110. Receiver 140 can then sample the received signals at a sampling rate, convert sampled signals to baseband Doppler signals, and feed the converted signals to processor 160. Processor 160 can perform a time-domain and/or frequency-domain method for detecting the presence of person 110 in accordance with the received Doppler signals in the environment.

Alternatively, object presence detector 100 can detect presence of an inanimate object or an animal, such as a moving vehicle or a cat walking in a room, by receiving signals, reflected from the vehicle or the cat, that experience a Doppler frequency shift because of the vehicle moving or cat walking. The received signals from the moving vehicle or the walking cat may be different from that from person 110. Object presence detector 100 can adjust to different sampling rates to detect presence of different objects.

Figure 2:
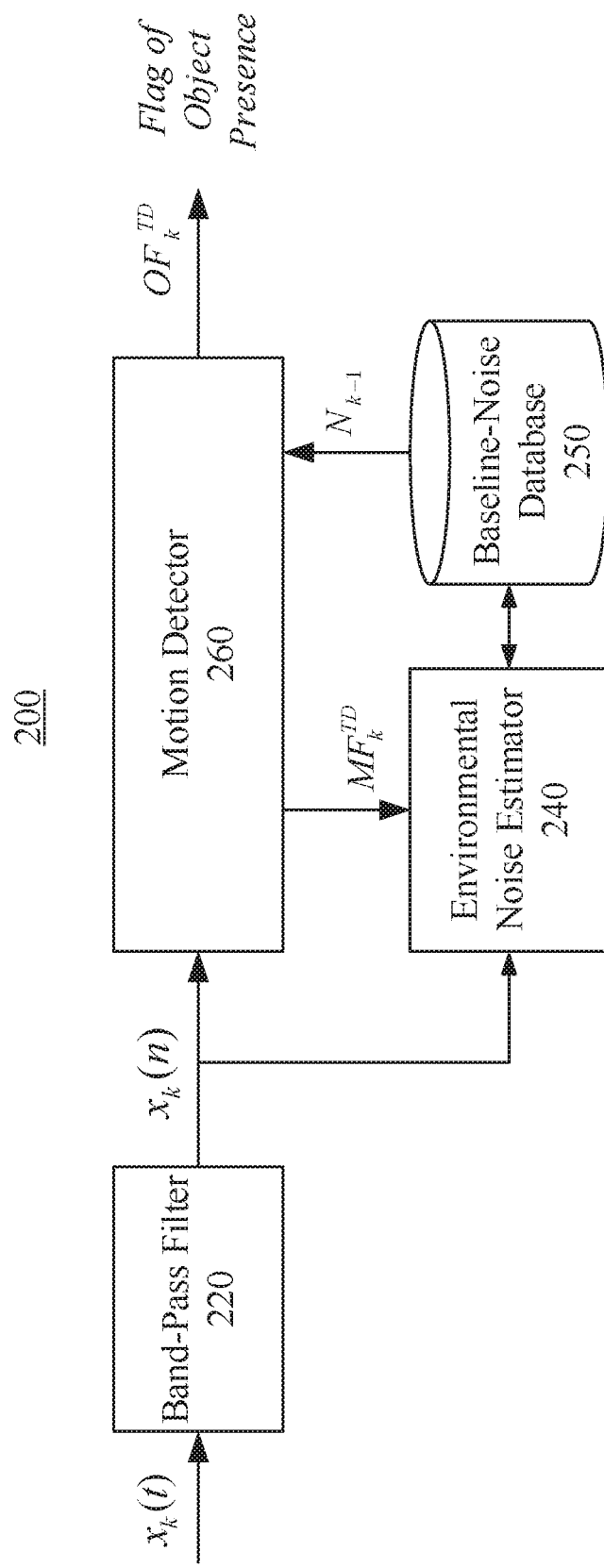
FIG. 2 illustrates an exemplary method for detecting presence of an object in time domain, according to some embodiments of the present disclosure.

FIG. 2 illustrates an exemplary system 200 for detecting presence of an object in the time domain, according to some embodiments of the present disclosure. System 200 is configured to filter a Doppler signal through a band-pass filter 220, estimate environmental noise in the time domain through an environmental noise estimator 240 and store the estimated environmental noise in a baseline-noise database 250, detect motion of an object by means of a motion detector 260, and determine whether the presence of an object is detected. System 200 may also be configured to send a flag of object motion to environmental noise estimator 240 to update an environmental noise.

System 200 may be implemented in object presence detector 100 or apparatus for detecting object presence. For example, as shown in FIG. 1, system 200 can be implemented by antenna 120, receiver 140, and processor 160 of object presence detector 100 to detect presence of person 110. Receiver 140 includes, for example, an analog-to-digital converter (ADC), a band-pass filter, and a signal processing circuit that are respectively configured to sample a Doppler signal, filter the sampled Doppler signal, and estimate environmental noise in the time domain and store estimated environmental noise in memory. Processor 160 is configured to detect motion of an object, and determine whether presence of an object is detected. Processor 160 may also be configured to send a flag of object motion to receiver 140 to update an environmental noise. In some embodiments, processor 160 can also be configured to estimate environmental noise in the time domain and store estimated environmental noise in memory.

In some embodiments, system 200 may be implemented by one or more application-specific integrated circuits (ASICs). For example, all or a part of band-pass filter 220, environmental noise estimator 240, baseline-noise database 250, and motion detector 260 can be implemented by one or more integrated circuits, registers, and/or a memory circuit. Other part of system 200 can be implemented by programs executed by one or more processors including, e.g., processor 160, interacting with the one or more ASICs.

As an exemplary scenario for system 200, when person 110 walks in an environment, system 200 receives a Doppler signal, $x_k(t)$, reflected from person 110, where k is an index of frames. The Doppler signal is defined as a signal that experiences a Doppler frequency shift due to movement of person 110. The received Doppler signal $x_k(t)$ can be analog or digital. When the received Doppler signal $x_k(t)$ is analog, system 200 can sample the received Doppler signal at an appropriate sampling rate $f_s$ before filtering the Doppler signal $x_k(t)$ through band-pass filter 220.

System 200 is configured to check each frame to detect for the presence of an object. Each frame includes, for example, 200 samples of the received Doppler signal. The sampling rate can be at least, for example, a double rate of the Doppler signal's frequency. For example, when system 200 is used to detect a Doppler signal at 200 Hz, 250 Hz, or 300 Hz. the sampling rate, $f_s$, is at least 400, 500, or 600 samples per second, respectively. System 200 may adjust the sampling rate to detect Doppler signals at different frequencies in accordance with a target to be detected.

As shown in FIG. 2, band-pass filter 220 is configured to receive and filter the Doppler signal, $x_k(t)$, in a frequency band. For example, band-pass filter 220 is configured to filter the received Doppler signal in a frequency band from 0 to 200 Hz, from 50 to 250 Hz, or from 0 to 300 Hz. Band-pass filter 220 can be, for example, a band-pass filter, a baseband filter, a root-raised-cosine filter, or a low-pass filter combined with a high-pass filter to pass the Doppler signal within the intended frequency band. After band-pass filter 220 filters the Doppler signal, the Doppler signal is output as $x_k(n)$, where k is an index of frames, n=0, 1, 2, ..., Ns−1, and Ns is a number of samples in a frame.

When the received Doppler signal $x_k(t)$ is analog, band-pass filter 220 includes an analog filter configured to filter the received Doppler signal in a frequency band as illustrated above and system 200 can sample a filtered Doppler signal to obtain the Doppler signal $x_k(n)$.

Environmental noise estimator 240 is configured to estimate environmental noise in the time domain in the environment. Before system 200 detects motion of an object, system 200 is configured to obtain an environmental noise in the environment. For example, environmental noise estimator 240 is configured to accumulate signal energies of $x_k(n)$ over current and previous twenty frames and average out an environmental noise energy. The environmental noise energy is defined as a baseline energy $N_k$ in the environment and is used to detect the presence of an object at the $k+1^{th}$ frame.

When system 200 detects the presence of an object in a frame, system 200 is configured to maintain a baseline energy at a value equal to that in a previous frame. For example, $N_k=N_{k-1}$ if person 110 is detected. On the other hand, when system 200 does not detect the presence of an object in a frame, system 200 is configured to update the baseline energy in accordance with a received signal energy (that is considered an environmental noise energy) in this frame and the baseline energy. For example, environmental noise estimator 240 is configured to update the baseline energy by a weighted moving average: $N_k=\Sigma_{i=0}^{L-2} w_i N_{k-i-1}+ w_{L-1} E\{x_k^2(n)\}$, where $\Sigma_{i=0}^{L-1} w_i=1$, $w_i$ is a weight of environmental noise energy of the $i^{th}$ frame in calculation of the updated baseline energy, and $E\{x_k^2(n)\}=\Sigma_{n=0}^{Ns-1} x_k^2(n)$.

Accordingly, system 200 is configured to detect the presence of an object in the k+1$^{th}$ frame in accordance with the updated baseline energy $N_k$.

In some embodiments, when system 200 does not detect the presence of an object in a frame, system 200 is configured to maintain a baseline energy at a value equal to that in a previous frame. In other words, system 200 is configured not to update the baseline energy.

After environmental noise estimator 240 estimates a baseline energy, system 200 is configured to store the estimated baseline energy in baseline-noise database 250. For example, after environmental noise estimator 240 accumulates signal energies of $x_k(n)$ over twenty frames and averages out a baseline energy $N_k$, system 200 is configured to store the baseline energy $N_k$ in baseline-noise database 250. As another example, when system 200 does not detect the presence of an object in a frame, environmental noise estimator 240 updates the baseline energy as described above and system 200 is configured to store the updated baseline energy in baseline-noise database 250.

Motion detector 260 is configured to detect motion of an object in a frame. For example, as shown in FIG. 2, motion detector 260 receives the Doppler signal, $x_k(n)$, in the k$^{th}$ frame and determines signal energy of $x_k(n)$ in the time domain: $s_k = E\{x_k^2(n)\} = \sum_{n=0}^{Ns-1} x_k^2(n)$, where Ns is a number of samples in a frame. Motion detector 260 is further configured to determine whether motion of the object is detected in accordance with the Doppler signal and a baseline energy. For example, motion detector 260 determines whether motion of person 110 is detected in accordance with the Doppler signal energy $s_k$ and a baseline energy $N_{k-1}$ in the k$^{th}$ frame as follows:

$MF_k^{TD} = 1$ if $s_k > \beta N_{k-1}$, and $MF_k^{TD} = 0$ if $s_k < \beta N_{k-1}$, where $MF_k^{TD}$ is a flag of object motion in the time domain in the k$^{th}$ frame, $\beta N_{k-1}$ is a threshold of object motion detection, and $\beta = c \times SNRthr$, where c is a constant and SNRthr is an signal-to-noise ratio threshold.

When the Doppler signal energy $s_k$ is greater than the threshold $\beta N_{k-1}$, motion detector 260 determines that motion of the object is detected and sets the flag of object motion, e.g., $MF_k^{TD} = 1$. When the Doppler signal energy $s_k$ is less than the threshold $\beta N_{k-1}$, motion detector 260 determines that motion of the object is not detected and does not set the flag of object motion, e.g., $MF_k^{TD} = 0$. Environmental noise estimator 240 updates the baseline energy by the above-described weighted moving average: $N_k = \sum_{i=0}^{L-2} w_i N_{k-i-1} + w_{L-1} E\{x_k^2(n)\}$.

After motion detector 260 determines whether motion of the object is detected and accordingly, sets or does not set the flag of object motion $MF_k^{TD}$, motion detector 260 is also configured to set a flag of object presence, $OF_k^{TD}$ in accordance with the flag of object motion $MF_k^{TD}$. For example, motion detector 260 sets: $OF_k^{TD} = MF_k^{TD}$.

In some embodiments, when system 200 does not detect motion of an object in accordance with the Doppler signal energy and the baseline energy in the time domain, system 200 is also configured to determine whether motion of the object is detected in accordance with a Doppler signal and a baseline energy in the frequency domain. When system 200 also determines that motion of the object is not detected in accordance with the Doppler signal and the baseline energy in the frequency domain, system 200 determines that motion of the object is not detected in accordance with the Doppler signal and updates the baseline energy in accordance with the signal energy in the time domain. For example, environmental noise estimator 240 updates the baseline energy by the above-described weighted moving average: $N_k = \sum_{i=0}^{L-2} w_i N_{k-i-1} + w_{L-1} E\{x_k^2(n)\}$.

Figure 3:
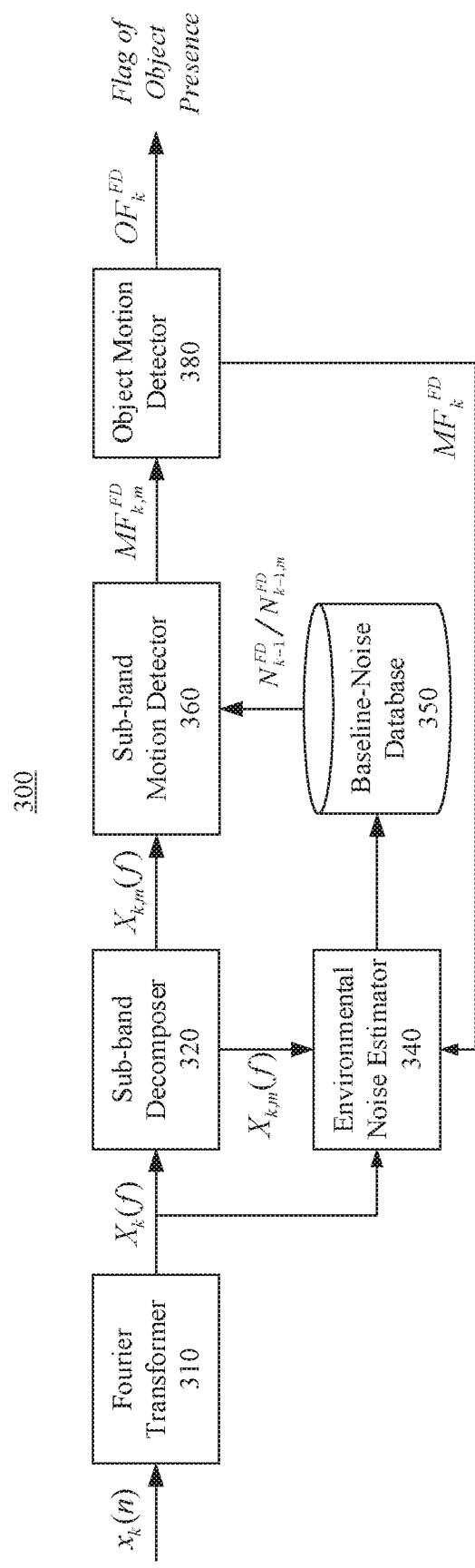
FIG. 3 illustrates an exemplary method for detecting presence of an object in frequency domain, according to some embodiments of the present disclosure.

FIG. 3 illustrates an exemplary system 300 for detecting presence of an object in the frequency domain, according to some embodiments of the present disclosure. System 300 is configured to transform a Doppler signal to the frequency domain through a Fourier transformer 310, estimate environmental noise in the frequency domain through an environmental noise estimator 340 and store estimated environmental noise in a baseline-noise database 350, decompose the Doppler signal into sub-band signals through sub-band decomposer 320, detect motion of an object in sub-bands through a sub-band motion detector 360, and determine whether presence of an object is detected through object motion detector 380. System 300 may also be configured to send a flag of object presence to environmental noise estimator 340 to update an environmental noise.

Similar to implementation alternatives of system 200, system 300 may be implemented in object presence detector 100 or apparatus for detecting object presence, as illustrated above for system 200. System 300 can also be partly or fully implemented by one or more ASICs and/or programs, as illustrated and described above for system 200.

As an exemplary scenario for system 300, when person 110 walks in an environment, system 300 receives a Doppler signal $x_k(t)$ in the time domain, where k is an index of frames. System 300 then band-pass filters the Doppler signal in a frequency band, for example, from 0 to 250 Hz and obtains a Doppler signal $x_k(n)$, where k is an index of frames, n=0, 1, 2, ..., Ns−1, and Ns is a number of samples in a frame.

As shown in FIG. 3, Fourier transformer 310 is configured to transform the Doppler signal $x_k(n)$ in the time domain to a Doppler signal $X_k(f)$ in the frequency domain, where k is an index of frames, 1=0, 1, 2, ..., Ns−1, and Ns is a number of samples in a frame. For example, Fourier transformer 310 includes a short-time Fourier transform (STFT) or a filter bank. Thus, system 300 transforms the Doppler signal in the time domain to the Doppler signal in the frequency domain using the STFT or the filter bank. Accordingly, system 300 receives the Doppler signal $X_k(f)$ during a frame in the frequency domain.

Sub-band decomposer 320 is configured to separate the Doppler signal in the frequency domain into a plurality of sub-band signals. For example, as shown in FIG. 3, sub-band decomposer 320 receives the Doppler signal $X_k(f)$ during a frame in the frequency domain and separates the Doppler signal into five sub-band signals $X_{k,m}(f)$, where m is an index of sub-bands and m=0, 1, 2, ..., 4. In one embodiment, the five sub-band signals are in sub-bands 0-50 Hz, 50-100 Hz, 100-150 Hz, 150-200, and 200-250 Hz. Sub-band decomposer 320 then sends the five sub-band signals $X_{k,m}(f)$ to sub-band motion detector 360.

Environmental noise estimator 340 is configured to estimate environmental noise in the frequency domain in the environment. Before system 300 detects motion of an object, system 300 is configured to obtain an environmental noise in the environment. For example, environmental noise estimator 340 is configured to accumulate signal energies of $X_k(f)$ over current and previous twenty frames and average out an environmental noise energy in the frequency domain. The environmental noise energy in the k$^{th}$ frame in the frequency domain is defined as a baseline energy $N_k^{FD}$ in the frequency domain in the environment and is used to detect the presence of an object in the k+1$^{th}$ frame.

When system 300 detects the presence of an object in a frame, system 300 is configured to maintain a baseline energy at a value equal to that in a previous frame. For example, $N_k^{FD}=N_{k-1}^{FD}$ if person 110 is detected. On the other hand, when system 300 does not detect the presence of an object in a frame, system 300 is configured to update a baseline energy in accordance with a received signal energy (that is considered as an environmental noise energy) in this frame and the baseline energy. For example, environmental noise estimator 340 is configured to update the baseline energy by a weighted moving average: $N_k^{FD}=\Sigma_{i=0}^{L-2}w_i N_{k-i-1}^{FD}+w_{L-1}E\{X_k^2(f)\}$, where $\Sigma_{i=0}^{L-1}w_i=1$, $w_i$ is a weight of environmental noise energy of the $i^{th}$ frame in calculation of an updated baseline energy, and $E\{X_k^2(f)\}=\Sigma_{f=0}^{Ns-1}X_k^2(f)$. Accordingly, system 300 is configured to detect presence of an object in the $k+1^{th}$ frame in accordance with the updated baseline energy $N_k^{FD}$.

In some embodiments, when system 300 does not detect the presence of an object in a frame, system 300 is configured to maintain a baseline energy at a value equal to that in a previous frame. In other words, system 300 is configured not to update the baseline energy.

After environmental noise estimator 340 estimates a baseline energy, system 300 is configured to store the estimated baseline energy in baseline-noise database 350. For example, after environmental noise estimator 340 accumulates signal energies of $X_k(f)$ over twenty frames and averages out a baseline energy $N_k^{FD}$ in the frequency domain, system 300 is configured to store the baseline energy $N_k^{FD}$ in baseline-noise database 350. As another example, when system 300 does not detect the presence of an object in a frame, environmental noise estimator 340 updates the baseline energy as described above and system 300 is configured to store the updated baseline energy in baseline-noise database 350.

In some embodiments, environmental noise estimator 340 is configured to estimate environmental noises in respective sub-bands in the environment. Thus, sub-band decomposer 320 also sends sub-band signals $X_{k,m}(f)$ to environmental noise estimator 340. Before system 300 detects motion of an object, system 300 is configured to obtain environmental sub-band baseline energies in the environment. For example, environmental noise estimator 340 is configured to accumulate sub-band signal energies of $X_{k,m}(f)$ in five sub-bands over current and previous twenty frames and average out environmental sub-band noise energies. The environmental sub-band noise energies in the $k^{th}$ frame are defined as sub-band baseline energies $N_{k,m}^{FD}$ for the m sub-bands in the environment and are used to detect the presence of an object at the $k+1^{th}$ frame.

When system 300 detects presence of an object in a frame, system 300 is configured to maintain sub-band baseline energies at values equal to those in a previous frame. For example, $N_{k,m}^{FD}=N_{k-1,m}^{FD}$ if person 110 is detected. On the other hand, when system 300 does not detect the presence of an object in a frame, system 300 is configured to update sub-band baseline energies in accordance with received sub-band signal energies (that are considered as environmental sub-band noise energies) in this frame and the sub-band baseline energies. For example, environmental noise estimator 340 is configured to update the sub-band baseline energies by a weighted moving average: $N_{k,m}^{FD}=\Sigma_{i=0}^{L-2}w_i N_{k-i-1,m}^{FD}+w_{L-1}E\{X_{k,m}^2(f)\}$, where $\Sigma_{i=0}^{L-1}w_i=1$, $w_i$ is a weight of environmental noise energy of the $i^{th}$ frame in calculation of updated sub-band baseline energies, and $E\{X_{k,m}^2(f)\}=\Sigma_{f=0}^{Ns-1}X_{k,m}^2(f)$. Accordingly, system 300 is configured to detect the presence of an object in the $k+1^{th}$ frame in accordance with the updated sub-band baseline energies $N_{k,m}^{FD}$.

In some embodiments, when system 300 does not detect the presence of an object in a frame, system 300 is configured to maintain sub-band baseline energies at values equal to those in a previous frame. In other words, system 300 is configured not to update the sub-band baseline energies.

After environmental noise estimator 340 estimates a baseline energy, system 300 is configured to store the estimated sub-band baseline energies in baseline-noise database 350. For example, after environmental noise estimator 340 accumulates sub-band signal energies of $X_{k,m}(f)$ over twenty frames and averages out sub-band baseline energy $N_{k,m}^{FD}$, system 300 is configured to store the sub-band baseline energies $N_{k,m}^{FD}$ in baseline-noise database 350. As another example, when system 300 does not detect presence of an object in a frame, environmental noise estimator 340 updates the sub-band baseline energies as described above and system 300 is configured to store the updated sub-band baseline energies in baseline-noise database 350.

Each component of system 300 can read baseline energy and/or sub-band baseline energies from baseline-noise database 350 whenever the component of system 300 needs the baseline energy and/or sub-band baseline energies. For example, when sub-band motion detector 360 determines motion of an object in sub-bands, sub-band motion detector 360 reads sub-band baseline energies from baseline-noise database 350.

Sub-band motion detector 360 is configured to detect motion of an object in sub-bands in a frame in the frequency domain. For example, as shown in FIG. 3, sub-band motion detector 360 receives five sub-band signals in the frequency domain, $X_{k,m}(f)$, in the $k^{th}$ frame and determines signal energies of $X_{k,m}(f)$ in the frequency domain: $S_{k,m}=E\{X_{k,m}^2(f)\}=\Sigma_{f=0}^{Ns-1}X_{k,m}^2(f)$, where k is an index of frames, m is an index of sub-bands, and Ns is a number of samples in a frame. The determined sub-band signal energies, $S_{k,m}$, corresponds to the five sub-band signals $X_{k,m}(f)$, where m=0, 1, 2, 3, and 4.

Sub-band motion detector 360 then determines whether motion of the object is detected in accordance with one of sub-band signal energies and a baseline energy. For example, sub-band motion detector 360 determines whether motion of person 110 is detected in accordance with sub-band signal energies $S_{k,m}$ and a baseline energy $N_{k-1}^{FD}$ in the $k^{th}$ frame as follows:

$$MF_{k,m}^{FD}=1 \text{ if } S_{k,m} \geq 2\beta N_{k-1}^{FD}, \text{ and}$$

$$MF_{k,m}^{FD}=0 \text{ if } S_{k,m} < 2\beta N_{k-1}^{FD},$$

where $MF_{k,m}^{FD}$ is a flag of sub-band object motion in the $m^{th}$ sub-band in the $k^{th}$ frame, $2\beta N_{k-1}^{FD}$ is a threshold of object motion detection and $\beta=c\times SNRthr$, where c is a constant and SNRthr is a signal-to-noise ratio threshold.

When a sub-band signal energy $S_{k,m}$ is equal to or greater than the threshold $2\beta N_{k-1}^{FD}$, sub-band motion detector 360 determines that motion of the object is detected and sets the flag of sub-band object motion, e.g., $MF_{k,m}^{FD}=1$. For example, when sub-band motion detector 360 determines that sub-band signal energy $S_{k,2}$ is greater than the threshold $2\beta N_{k-1}^{FD}$, sub-band motion detector 360 determines that motion of the object is detected in the sub-band and sets the flag of sub-band object motion, e.g., $MF_{k,2}^{FD}=1$. When sub-band signal energy $S_{k,m}$ is less than the threshold $2\beta N_{k-1}^{FD}$, sub-band motion detector 360 determines that motion of the object is not detected in the sub-band and does not set the flag of sub-band object motion, e.g., $MF_{k,m}^{FD}=0$, m=0, 1, 3, and 4.

As another example, sub-band motion detector 360 determines whether motion of person 110 is detected in accordance with sub-band signal energies $S_{k,m}$ and a baseline energy $N_{k-1}^{FD}$ in the $k^{th}$ frame as follows:

$$MF_{k,m}^{FD}=1 \text{ if } S_{k,m} \geq \beta N_{k-1}^{FD}, \text{ and}$$

$$MF_{k,m}^{FD}=0 \text{ if } S_{k,m} < \beta N_{k-1}^{FD},$$

where $MF_{k,m}^{FD}$ is a flag of sub-band object motion in the $m^{th}$ sub-band in the $k^{th}$ frame, $\beta N_{k-1}^{FD}$ is a threshold of object motion detection, and $\beta=c \times SNRthr$, where c is a constant and SNRthr is a signal to noise ratio threshold.

When a sub-band signal energies $S_{k,m}$ is equal to or greater than the threshold $\beta N_{k-1}^{FD}$, sub-band motion detector 360 determines that motion of the object is detected in the sub-band and sets the flag of sub-band object motion, e.g., $MF_{k,m}^{FD}=1$. For example, when sub-band motion detector 360 determines that sub-band signal energy $S_{k,1}$ is greater than the threshold $\beta N_{k-1}^{FD}$, sub-band motion detector 360 determines that motion of the object in the sub-band is detected and sets the flag of sub-band object motion, e.g., $MF_{k,1}^{FD}=1$. When sub-band motion detector 360 determines that sub-band signal energy $S_{k,2}$ is greater than the threshold $\beta N_{k-1}^{FD}$, sub-band motion detector 360 also determines that motion of the object is detected in the sub-band and sets the flag of sub-band object motion, e.g., $MF_{k,2}^{FD}=1$. When the remaining sub-band signal energies $S_{k,m}$ are less than the threshold $\beta N_{k-1}^{FD}$, sub-band motion detector 360 determines that motion of the object is not detected in the remaining sub-bands and does not set the flags of sub-band object motion, e.g., $MF_{k,m}^{FD}=0$, m=0, 3, and 4.

In some embodiments, the baseline energy includes a plurality of sub-band baseline energies corresponding to the plurality of sub-band signals. For example, environmental noise estimator 340 estimates environmental noises in respective sub-bands in the environment and averages out sub-band baseline energies $N_{k,m}^{FD}$, where m=0, 1, 2, 3, and 4. Sub-band motion detector 360 is configured to detect motion of an object in sub-bands in a frame in accordance with respective sub-band baseline energies. For example, sub-band motion detector 360 determines whether motion of person 110 is detected in accordance with sub-band signal energies $S_{k,m}$ and a sub-band baseline energy $N_{k-1,m}^{FD}$ in the $k^{th}$ frame as follows:

$$MF_{k,m}^{FD}=1 \text{ if } S_{k,m} \geq 2\beta N_{k-1,m}^{FD}, \text{ and}$$

$$MF_{k,m}^{FD}=0 \text{ if } S_{k,m} < 2\beta N_{k-1,m}^{FD},$$

where $MF_{k,m}^{FD}$ is a flag of sub-band object motion in the $m^{th}$ sub-band in the $k^{th}$ frame, $2\beta N_{k-1,m}^{FD}$ is a threshold of object motion detection, and $\beta=c \times SNRthr$, where c is a constant and SNRthr is a signal to noise ratio threshold.

When a sub-band signal energy $S_{k,m}$ is equal to or greater than the threshold $2\beta N_{k-1,m}^{FD}$, sub-band motion detector 360 determines that motion of the object is detected and sets the flag of sub-band object motion, e.g., $MF_{k,m}^{FD}=1$. For example, when sub-band motion detector 360 determines that sub-band signal energy $S_{k,2}$ is greater than the threshold $2\beta N_{k-1,2}^{FD}$, sub-band motion detector 360 determines that motion of the object is detected in the sub-band and sets the flag of sub-band object motion, e.g., $MF_{k,2}^{FD}=1$. When a sub-band signal energy $S_{k,m}$ is less than the threshold $2\beta N_{k-1,m}^{FD}$, sub-band motion detector 360 determines that motion of the object is not detected in the sub-band and does not set the flag of sub-band object motion, e.g., $MF_{k,m}^{FD}=0$, m=0, 1, 3, and 4.

As another example, sub-band motion detector 360 determines whether motion of person 110 is detected in accordance with sub-band signal energies $S_{k,m}$ and a baseline energy $N_{k-1,m}^{FD}$ in the $k^{th}$ frame as follows:

$$MF_{k,m}^{FD}=1 \text{ if } S_{k,m} \geq 2\beta N_{k-1,m}^{FD}, \text{ and}$$

$$MF_{k,m}^{FD}=0 \text{ if } S_{k,m} < 2\beta N_{k-1,m}^{FD},$$

where $MF_{k,m}^{FD}$ is a flag of sub-band object motion in the $m^{th}$ sub-band in the $k^{th}$ frame, $\beta N_{k-1,m}^{FD}$, is a threshold of object motion detection, and $\beta=c \times SNRthr$, where c is a constant and SNRthr is a signal to noise ratio threshold.

When a sub-band signal energy $S_{k,m}$ is equal to or greater than the threshold $\beta N_{k-1,m}^{FD}$, sub-band motion detector 360 determines that motion of the object is detected in the sub-band and sets the flag of sub-band object motion, e.g., $MF_{k,m}^{FD}=1$. For example, when sub-band motion detector 360 determines that sub-band signal energy $S_{k-1}$ is greater than the threshold $\beta N_{k-1,1}^{FD}$, sub-band motion detector 360 determines that motion of the object in the sub-band is detected and sets the flag of sub-band object motion, e.g., $MF_{k,1}^{FD}=1$. When sub-band motion detector 360 determines that sub-band signal energy $S_{k,2}$ is greater than the threshold $\beta N_{k-1,2}^{FD}$, sub-band motion detector 360 also determines that motion of the object is detected in the sub-band and sets the flag of sub-band object motion, e.g., $MF_{k,2}^{FD}=1$. When the remaining sub-band signal energies $S_{k,m}$ are less than the threshold $\beta N_{k-1,m}^{FD}$, sub-band motion detector 360 determines that motion of the object is not detected in the remaining sub-bands and does not set the flags of sub-band object motion, e.g., $MF_{k,m}^{FD}=0$, m=0, 3, and 4.

After sub-band motion detector 360 detects motion of an object in sub-sub-bands in a frame, sub-band motion detector 360 sends all flags of sub-band object motion to object motion detector 380. For example, as shown in FIG. 3, sub-band motion detector 360 sends $MF_{k,m}^{FD}=0, 1, 2, 3,$ and 4, to object motion detector 380 to determine whether objection motion is detected.

Object motion detector 380 is configured to determine whether motion of an object is detected in accordance with the flags of sub-band object motion from sub-band motion detector 360. For example, when sub-band motion detector 360 determines whether motion of the object is detected in sub-bands in accordance with the threshold $2\beta N_{k-1}^{FD}$ or $2\beta N_{k-1,m}^{FD}$, and criteria thereof, object motion detector 380 determines that motion of the object is detected if one of five flags of sub-band objection motion is set, e.g., flag of object motion $MF_k^{FD}=1$ if $MF_{k,m}^{FD}=1$, where m=0, 1, 2, 3, or 4. For example, when $MF_{k,2}^{FD}=1$, object motion detector 380 determines that motion of the object is detected and sets $MF_k^{FD}=1$. When none of five flags of sub-band objection motion is set, object motion detector 380 determines that motion of the object is not detected and does not set the flag of object motion $MF_k^{FD}$.

As another example, when sub-band motion detector 360 determines object motion in sub-bands in accordance with the threshold $\beta N_{k-1}^{FD}$ or $\beta N_{k-1,m}^{FD}$, and criteria thereof, object motion detector 380 determines that motion of the object is detected if at least two of five flags of sub-band objection motion are set, e.g., $MF_k^{FD}=1$ if $MF_{k,i}^{FD}=1$ and $MF_{k,j}^{FD}=1$, where i=0, 1, 2, 3, or 4, j=0, 1, 2, 3, or 4, and i≠j. For example, when $MF_{k,1}^{FD}=1$ and $MF_{k,2}^{FD}=1$, object motion detector 380 determines that motion of the object is detected and sets $MF_k^{FD}=1$. Alternatively, object motion detector 380 can determine that motion of the object is detected if two of five flags of sub-band objection motion in two adjacent sub-bands are set, e.g., $MF_k^{FD}=1$ if $MF_{k,i}^{FD}=1$ and $MF_{k,i+1}^{FD}=1$, where i=0, 1, 2, or 3. When only one or none of five flags of sub-band objection motion is set, object motion detector 380 determines that motion of the object is not detected and does not set $MF_k^{FD}$.

In some embodiments, sub-band motion detector 380 determines whether motion of the object is detected in accordance with both thresholds $2\beta N_{k-1}^{FD}$ and $\beta N_{k-1}^{FD}$ or $2\beta N_{k-1,m}^{FD}$ and $\beta N_{k-1,m}^{FD}$ and criteria thereof as illustrated above in sub-band motion detector 360. For example, object motion detector 380 and sub-band motion detector 360 can jointly determine whether motion of person 110 is detected in accordance with sub-band signal energies $S_{k,m}$ and a sub-band baseline energy $N_{k-1,m}^{FD}$ in the $k^{th}$ frame as follows:

$MF_k^{FD}=1$ if $S_{k,m} \geq 2\beta N_{k-1,m}^{FD}, m=0,1,2,3,$ or 4, $MF_k^{FD}=1$ if $S_{k,i} > \beta N_{k-1,i}^{FD}$ and $S_{k,j} > \beta N_{k-1,j}^{FD}, i=0,1,2,3,$ or $4, j=0,1,2,3,$ or $4, i \neq j$, and $MF_k^{FD}=0$ otherwise, where $MF_k^{FD}$ is a flag of object motion in the $k^{th}$ frame, and $2\beta N_{k-1,m}^{FD}$, and $\beta N_{k-1,m}^{FD}$, are thresholds of object motion detection in sub-bands.

When a sub-band signal energy $S_{k,m}$ is equal to or greater than the threshold $2\beta N_{k-1,m}^{FD}$, object motion detector 380 and sub-band motion detector 360 can jointly determine that motion of the object is detected and sets the flag of object presence, e.g., $MF_k^{FD}=1$. When none of sub-band signal energies $S_{k,m}$ is greater than the threshold $2\beta N_{k-1,m}^{FD}$, and at least two sub-band signal energies $S_{k,i}$ and $S_{k,j}$ are greater than the thresholds $\beta N_{k-1,i}^{FD}$ and $\beta N_{k-1,j}^{FD}$, respectively, object motion detector 380 and sub-band motion detector 360 can jointly determine that motion of the object is detected and set the flag of object motion, e.g., $MF_k^{FD}=1$. Otherwise, object motion detector 380 and sub-band motion detector 360 can jointly determine that motion of the object is not detected and not set the flag of object motion, e.g., $MF_k^{FD}=0$.

When object motion detector 380 detects motion of the object, environmental noise estimator 340 does not update environmental sub-band baseline energy in accordance with sub-band signal energies in the frame. When object motion detector 380 does not detect motion of the object, environmental noise estimator 340 can update environmental sub-band baseline energy in accordance with sub-band signal energies in the frame. For example, environmental noise estimator 340 can update a sub-band baseline energy by a weighted moving average: $N_{k,m}^{FD} = \sum_{i=0}^{L-2} w_i N_{k-1,m}^{FD} + w_{L-1} E\{X_{k,m}^2(f)\}$, where $\sum_{i=0}^{L-1} w_i = 1$. In some embodiments, when object motion detector 380 does not detect motion of the object, environmental noise estimator 340 does not update the baseline energy in accordance with sub-band signal energies in the frame.

After object motion detector 380 determines whether motion of the object is detected and accordingly, sets or does not set the flag of object motion $MF_k^{FD}$, object motion detector 380 is also configured to set a flag of object presence $OF_k^{FD}$ in accordance with the flag of object motion $MF_k^{FD}$. For example, object motion detector 380 sets: $OF_k^{FD} = MF_k^{FD}$.

Figure 4:
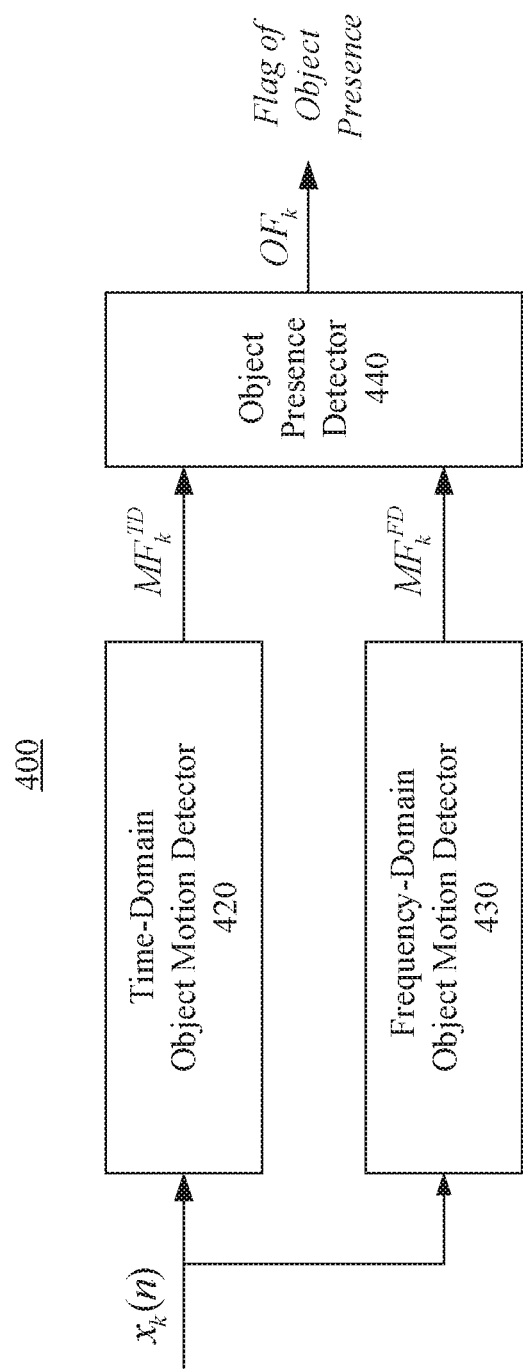
FIG. 4 illustrates an exemplary method for detecting presence of an object in time and frequency domains, according to some embodiments of the present disclosure.

FIG. 4 illustrates an exemplary system 400 for detecting presence of an object in the time and frequency domains, according to some embodiments of the present application. System 400 is configured to detect motion of an object in the time domain through a time-domain object motion detector 420, detect motion of the object in the frequency domain through a frequency-domain object motion detector 430, and detect presence of the object in accordance with flags of object motion in the time and frequency domains through an object presence detector 440.

Similar to implementation alternatives of system 200, system 400 may be implemented in object presence detector 100 or apparatus for detecting object presence, as illustrated above for system 200. System 400 can also be partly or fully implemented by one or more ASICs and/or programs, as illustrated above for system 200.

As an exemplary scenario for system 400, when person 110 walks in an environment, system 400 receives a Doppler signal $x_k(t)$ in the time domain, where k is an index of frames. System 400 then band-pass filters the Doppler signal in a frequency band, for example, from 0 to 250 Hz and obtains a Doppler signal, $x_k(n)$, where k is an index of frames, n=0, 1, 2, . . . , Ns−1, and Ns is a number of samples in a frame.

Time-domain object motion detector 420 is configured to detect motion of an object in the time domain. For example, time-domain object motion detector 420 receives the Doppler signal $x_k(n)$ in the time domain, determines whether motion of the object is detected in accordance with the Doppler signal $x_k(n)$ in the time domain and a baseline energy $N_{k-1}$, and sets a time-domain flag of object motion $MF_k^{TD}=1$ in response to a determination that motion of the object is detected. Time-domain object motion detector 420 can be configured to perform operations of system 200 described above with respect to the methods described above and shown in FIG. 2.

Frequency-domain object motion detector 430 is configured to detect motion of the object in the frequency domain. For example, frequency-domain object motion detector 430 is configured to transform the Doppler signal, $x_k(n)$, in the time domain to a Doppler signal $X_k(f)$ in the frequency domain, determine whether motion of the object is detected in accordance with the Doppler signal $X_k(f)$ in the frequency domain and a baseline energy $N_{k-1}^{FD}$ or a sub-band baseline energy $N_{k-1,m}^{FD}$, and set a frequency-domain flag of object motion $MF_k^{FD}=1$ in response to a determination that motion of the object is detected. Frequency-domain object motion detector 430 can be configured to perform operations of system 300 described above with respect to the methods shown in FIG. 3.

Object presence detector 440 is configured to detect presence of the object in accordance with flags of object motion in the time and frequency domains. For example, as show in FIG. 4, object presence detector 440 detects presence of the object and sets a flag of object presence $OF_k$, based on the time-domain flag of object motion $MF_k^{TD}$, and the frequency-domain flag of object motion $MF_k^{FD}$.

In some embodiments, frequency-domain object motion detector 430 is configured to detect motion of the object in the frequency domain when a criterion is met. For example, frequency-domain object motion detector 430 transforms the Doppler signal $x_k(n)$ in the time domain to a Doppler signal $X_k(f)$ in the frequency domain and proceeds with frequency-domain object motion detection when one of the following criteria is met:

(a) The time-domain flag $MF_k^{TD}$, is not set, e.g, $MF_k^{TD}=0$;
(b) The time-domain flag $MF_k^{TD}$, is set, e.g, $MF_k^{TD}=1$; or (c) The time-domain flag $MF_k^{TD}$, is set, e.g, $MF_k^{TD}=1$, and a signal energy $s_k$, of the Doppler signal in the time domain is less than a threshold.

In accordance with the criterion (a), frequency-domain object motion detector 430 transforms the Doppler signal $x_k(n)$ in the time domain to a Doppler signal $X_k(f)$ in frequency domain and proceeds with frequency-domain object motion detection when time-domain object motion detector 420 does not detect motion of the object in the time domain.

In accordance with the criterion (b), frequency-domain object motion detector 430 transforms the Doppler signal $x_k(n)$ in the time domain to a Doppler signal $X_k(f)$ in the frequency domain and proceeds with frequency-domain object motion detection when time-domain object motion detector 420 detects motion of the object in the time domain. Thus, frequency-domain object motion detector 430 detects motion of the object only when time-domain object motion detector 420 detects motion of the object. Thus, time-domain object motion detector 420 and frequency-domain object motion detector 430 both detect motion of the object and send time-domain and frequency-domain flags of object motion to object presence detector 440.

In accordance with the criterion (c), frequency-domain object motion detector 430 transforms the Doppler signal $x_k(n)$ in the time domain to a Doppler signal $X_k(f)$ in the frequency domain and proceeds with frequency-domain object motion detection when time-domain object motion detector 420 detects motion of the object in the time domain, but the signal energy $s_k$ of the Doppler signal in the time domain is less than a threshold, e.g., $s_k<1.2\beta N_{k-1}$. Thus, frequency-domain object motion detector 430 detects motion of the object when time-domain object motion detector 420 detects motion of the object, but the signal energy of the Doppler signal is not strong enough.

Figure 5:
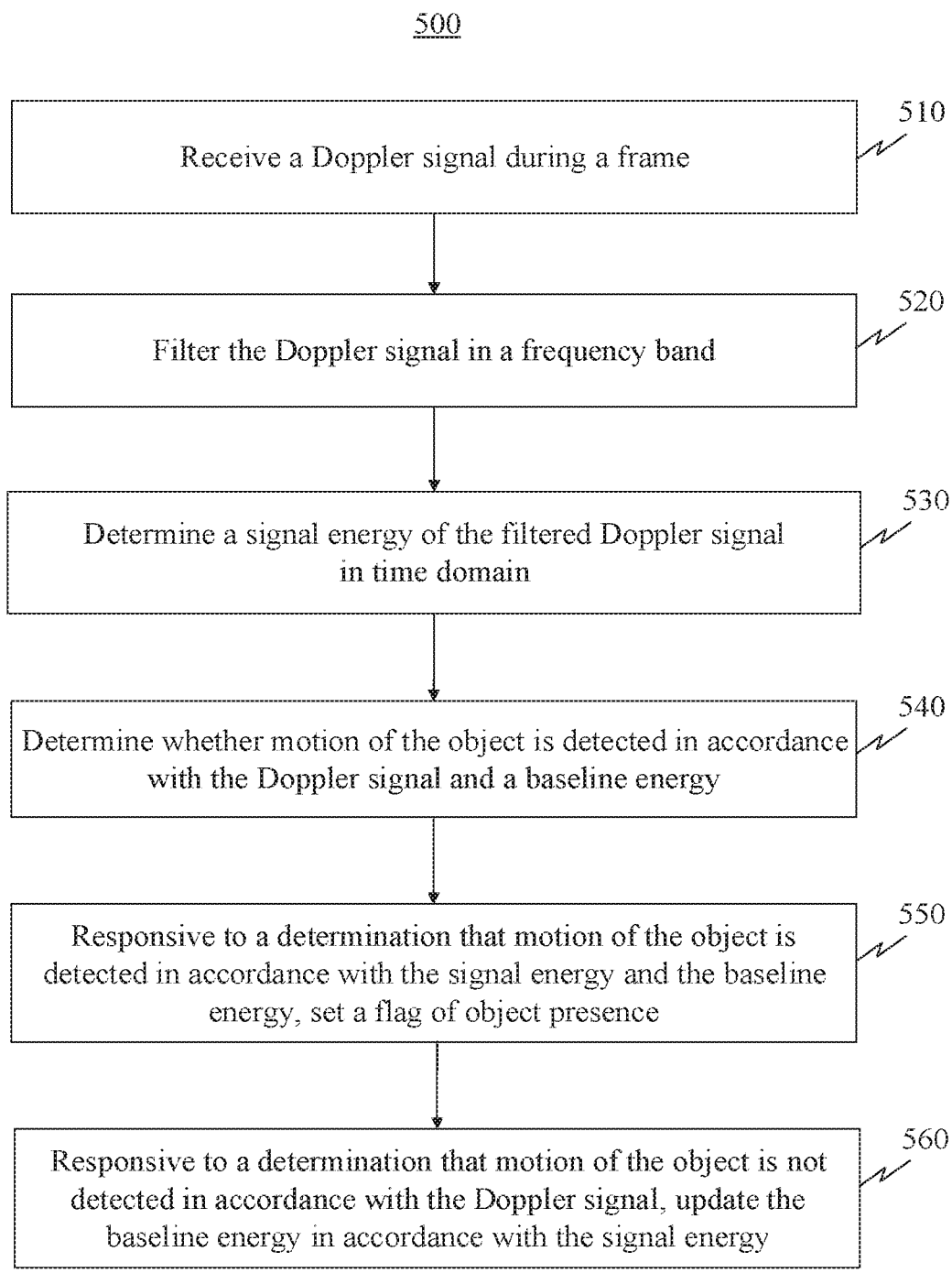
FIG. 5 is a flowchart of an exemplary method for detecting presence of an object in the time domain, according to some embodiments of the present disclosure.

FIG. 5 is a flowchart of an exemplary method for detecting presence of an object in the time domain, according to some embodiments of the present disclosure. Method 500 may be practiced by object presence detector 100 and systems 200, 300, and 400. Method 500 includes receiving a Doppler signal during a frame (step 510), filtering the Doppler signal in a frequency band (step 520), determining a signal energy of the filtered Doppler signal in the time domain (step 530), determining whether motion of the object is detected in accordance with the Doppler signal and a baseline energy (step 540), responsive to a determination that motion of the object is detected in accordance with the signal energy and the baseline energy, setting a flag of object presence (step 550), and responsive to a determination that motion of the object is not detected in accordance with the Doppler signal, updating the baseline energy in accordance with the signal energy (step 560).

Step 510 includes receiving a Doppler signal during a frame. For example, as shown in FIG. 2, system 200 receives a Doppler signal, $x_k(t)$ in the $k^{th}$ frame. Each frame includes, for example, 200 samples of the received Doppler signal.

Step 520 includes filtering the Doppler signal in a frequency band. For example, as illustrated system 200 in FIG. 2, band-pass filter 220 filters the received Doppler signal $x_k(t)$ in a frequency band from 0 to 200 Hz, from 50 to 250 Hz, or from 0 to 300 Hz. After band-pass filter 220 filters the Doppler signal, the Doppler signal is output as $x_k(n)$, where k is an index of frames, n=0, 1, 2, . . . , Ns−1, and Ns is a number of samples in a frame.

Step 530 includes determining a signal energy of the filtered Doppler signal in the time domain. For example, as shown in FIG. 2, motion detector 260 receives the Doppler signal $x_k(n)$ in the $k^{th}$ frame and determines a signal energy of $x_k(n)$ in time domain: $s_k=E\{x_k^2(n)\}=\Sigma_{n=0}^{Ns-1} x_k^2(n)$ where Ns=200.

Step 540 includes determining whether motion of the object is detected in accordance with the Doppler signal and a baseline energy. For example, as illustrated system 200 in FIG. 2, motion detector 260 determines whether motion of person 110 is detected in accordance with the Doppler signal energy $s_k$ and a baseline energy $N_{k-1}$ in the $k^{th}$ frame as follows:

$MF_k^{TD}=1$ if $s_k \geq \beta N_{k-1}$, and $MF_k^{TD}=0$ if $s_k < \beta N_{k-1}$, where $MF_k^{TD}$ is a flag of object motion in time domain in the $k^{th}$ frame, $\beta N_{k-1}$ is a threshold of object motion detection, and $\beta = c \times SNRthr$, where c is a constant and SNRthr is an signal to noise ratio threshold.

When the Doppler signal energy $s_k$ is equal to or greater than the threshold $\beta N_{k-1}$, motion detector 260 determines that motion of the object is detected and sets the flag of object motion, e.g., $MF_k^{TD}=1$. When the Doppler signal energy $s_k$ is less than the threshold $\beta N_{k-1}$, motion detector 260 determines that motion of the object is not detected and does not set the flag of object motion, e.g., $MF_k^{TD}=0$. The threshold $\beta N_{k-1}$ is obtained in accordance with a baseline energy $N_{k-1}$ (i.e., the environmental noise energy) in the environment and $\beta = c \times SNRthr$, where c is a constant and SNRthr is a signal-to-noise ratio threshold.

Step 550 includes, responsive to a determination that motion of the object is detected in accordance with the signal energy and the baseline energy, setting a flag of object presence. For example, as illustrated in system 200 in FIG. 2, when the Doppler signal energy $s_k$ is greater than the threshold $\beta N_{k-1}$ and motion detector 260 determines that motion of the object is detected, motion detector 260 sets the flag of object motion, e.g., $MF_k^{TD}=1$. That is, after motion detector 260 determines whether motion of the object is detected and accordingly, sets or does not set the flag of object motion $MF_k^{TD}$, motion detector 260 sets a flag of object presence, $OF_k^{TD}$ in accordance with the flag of object motion $MF_k^{TD}$. For example, motion detector 260 sets: $OF_k^{TD}=MF_k^{TD}$.

Step 560 includes, responsive to a determination that motion of the object is not detected in accordance with the Doppler signal, updating the baseline energy in accordance with the signal energy. For example, as illustrated in system 200 in FIG. 2, when the Doppler signal energy $s_k$ is less than the threshold $\beta N_{k-1}$ and motion detector 260 determines that motion of the object is not detected, motion detector 260 does not set the flag of object motion, e.g., $MF_k^{TD}=0$. Environmental noise estimator 240 updates the baseline energy $N_k$ by the weighted moving average: $N_k = \Sigma_{i=0}^{L-2} w_i N_{k-i-1} + w_{L-1} E\{x_k^2(n)\}$.

In some embodiments, step 540 further includes determining that motion of the object is not detected in accordance with the Doppler signal in the time domain and the Doppler signal in the frequency domain. For example, when system 200 does not detect motion of an object in accordance with the Doppler signal energy and the baseline energy in the time domain, system 200 can determine whether motion of the object is detected in accordance with a Doppler signal and a baseline energy in the frequency domain, as illustrated by methods in FIG. 3. When system 200 also determines that motion of the object is not detected in accordance with the Doppler signal and the baseline energy in the frequency domain, system 200 determines that motion of the object is not detected in accordance with the Doppler signal and updates the baseline energy in accordance with the signal energy in the time domain. For example, environmental noise estimator 240 updates the baseline energy by the weighted moving average: $N_k = \Sigma_{i=0}^{L-2} w_i N_{k-i-1} + w_{L-1} E\{x_k^2(n)\}$.

In some embodiments, the threshold in step 540 is determined based on a baseline energy and another threshold. For example, the threshold $\beta N_{k-1}$ is obtained in accordance with a baseline energy $N_{k-1}$ (i.e., the environmental noise energy) in the environment and a $\beta = c \times SNRthr$, where c is a constant and SNRthr is a signal-to-noise ratio threshold. Thus, the threshold in step 540 (e.g., $\beta N_{k-1}$) is determined based on a baseline energy (e.g., a baseline energy $N_{k-1}$) and another threshold (e.g., SNRthr).

In some embodiments, step 560 can include, responsive to a determination that motion of the object is not detected in accordance with the Doppler signal, updating the baseline energy in accordance with a weighted average of the signal energy and the baseline energy. For example, as illustrated by system 200 in FIG. 2, when motion detector 260 determines that motion of the object is not detected and does not set the flag of object motion, e.g., $MF_k^{TD}=0$, environmental noise estimator 240 updates the baseline energy $N_k$ by the weighted moving average: $N_k = \Sigma_{i=0}^{L-2} w_i N_{k-i-1} + w_{L-1} E\{x_k^2(n)\}$, where $E\{x_k^2(n)\}$ is the signal energy in the $k^{th}$ frame (that is considered as an environmental noise energy) and $N_{k-i-1}$ is the baseline energy in the $k-i-1^{th}$ frame.

In some embodiments, step 560 can include, responsive to a determination that motion of the object is not detected in accordance with the Doppler signal, updating the baseline energy in accordance with the signal energy in the frame and another signal energy in a previous frame. For example, as illustrated by system 200 in FIG. 2, when motion detector 260 determines that motion of the object is not detected and does not set the flag of object motion, e.g., $MF_k^{TD}=0$, environmental noise estimator 240 updates the baseline energy $N_k$ by the weighted moving average: $N_k = \Sigma_{i=0}^{L-2} w_i N_{k-i-1} + w_{L-1} E\{x_k^2(n)\}$, where $E\{x_k^2(n)\}$ is the signal energy in the $k^{th}$ frame (that is considered as an environmental noise energy) and $N_{k-i-1}$ is the baseline energy in the $k-i-1^{th}$ frame.

The $k-i-1^{th}$ frame is a previous frame for the $k^{th}$ frame. The baseline energy in the $k-i-1^{th}$ frame, $N_{k-i-1}$, may include signal energy in a previous frame. For example, when motion detector 260 determines that motion of the object is not detected in the $k-1^{th}$ frame and does not set the flag of object motion, e.g., $MF_k^{TD}=0$, environmental noise estimator 240 updates the baseline energy $N_{k-1}$ by a similar weighted moving average: $N_{k-1} = \Sigma_{i=0}^{L-2} w_i N_{k-i-2} w_{L-1} E\{x_{k-1}^2(n)\}$, where $E\{x_{k-1}^2(n)\}$ is the signal energy in the $k-1^{th}$ frame (that is considered as an environmental noise energy), which is a previous frame for the $k^{th}$ frame. In such an update, the baseline energy $N_k$ is determined based on the weighted moving average of the signal energies at least in the $k-1^{th}$ and $k^{th}$ frames when motion of the object is not present in the frames.

In some embodiments, the baseline energy in step 540 is a first baseline energy and method 500 further includes, responsive to a determination that motion of the object is not detected, determining whether motion of the object is detected in accordance with the signal energy and a second baseline energy, and responsive to a determination that motion of the object is detected in accordance with the signal energy and the second baseline energy, setting the flag of object presence.

For example, as illustrated by system 200 in FIG. 2, the baseline energy $N_{k-1}$ can be a first baseline energy. When the Doppler signal energy $s_k$ is less than the threshold $\beta N_{k-1}$, motion detector 260 determines that motion of the object is not detected and does not set the flag of object motion, e.g., $MF_k^{TD}=0$. In response to the determination that motion of the object is not detected, motion detector 260 can be configured to determine whether motion of the object is detected in accordance with the signal energy $s_k$ and another threshold, e.g., $\alpha N_{k-1}^{st}$, which is obtained based on a second baseline energy $N_{k-1}^{st}$. Accordingly, motion detector 260 determines whether motion of person 110 is detected in accordance with the Doppler signal energy $s_k$ and the baseline energy $N_{k-1}^{st}$ in the $k^{th}$ frame as follows:

$MF_k^{TD}=1$ if $s_k \geq \beta N_{k-1}^{st}$, and $MF_k^{TD}=0$ if $s_k < \beta N_{k-1}^{st}$, where $MF_k^{TD}$ is a flag of object motion in the time domain in the $k^{th}$ frame, $\alpha N_{k-1}^{st}$ is a threshold of object motion detection, and $\alpha = c^{st} \times SNRthr^{st}$, where $c^{st}$ is a constant and $SNRthr^{st}$ is a signal to noise ratio threshold.

When the Doppler signal energy $s_k$ is equal to or greater than the threshold $\alpha N_{k-1}^{st}$, motion detector 260 determines that motion of the object is detected and sets the flag of object motion, e.g., $MF_k^{TD}=1$. When the Doppler signal energy $s_k$ is less than the threshold $\alpha N_{k-1}^{st}$, motion detector 260 determines that motion of the object is not detected and does not set the flag of object motion, e.g., $MF_k^{TD}=0$. The threshold $\alpha N_{k-1}^{st}$, is obtained in accordance with a baseline energy $N_{k-1}^{st}$ (i.e., an environmental noise energy) in the environment and $\alpha = c^{st} \times SNRthr^{st}$, where $c^{st}$ is a constant and $SNRthr^{st}$ is a signal-to-noise ratio threshold.

In some embodiments, when the Doppler signal energy $S_k$ is less than the threshold $\beta N_{k-1}$ but equal to or larger than $0.7 \beta N_{k-1}$, method 500 further includes operations described above in accordance with the second baseline energy $N_{k-1}^{st}$.

In some embodiments, step 560 further includes, responsive to a determination that motion of the object is not detected in accordance with the signal energy and the second baseline energy, updating the second baseline energy in accordance with the signal energy. For example, when the Doppler signal energy $s_k$ is less than the threshold $\alpha N_{k-1}^{st}$ and motion detector 260 determines that motion of the object is not detected, motion detector 260 does not set the flag of object motion, e.g., $MF_k^{TD}=0$. Environmental noise estimator 240 updates the second baseline energy $N_{k-1}^{st}$ by the weighted moving average: $N_k^{st} = \Sigma_{i=0}^{L-2} w_i N_{k-i-1}^{st} + w_{L-1} E\{x_k^2(n)\}$, where $E\{x_k^2(n)\}$ is the signal energy in the $k^{th}$ frame (that is considered as an environmental noise energy) and $N_{k-i-1}^{st}$ is the second baseline energy of environmental noise in the $k-i-1^{th}$ frame.

In some embodiments, the second baseline energy is determined based on a weighted moving average of a plurality of signal energies when motion of the object is not present, wherein the plurality of signal energies are energies of a plurality of Doppler signals received over a longer period than that of the first baseline energy. For example, when motion detector 260 determines that motion of the object is not detected and does not set the flag of object motion, e.g., $MF_k^{TD}=0$, environmental noise estimator 240 updates the second baseline energy $N_{k-1}^{st}$ by the weighted moving average: $N_k^{st} + \Sigma_{i=0}^{L-2} w_i N_{k-i-1}^{st} + w_{L-1} E\{x_k^2(n)\}$, where $E\{x_k^2(n)\}$ is the signal energy in the $k^{th}$ frame (that is considered as an environmental noise energy) and $N_{k-i-1}^{st}$ is the second baseline energy of environmental noise in the $k-i-1^{th}$ frame.

The k−i−1$^{th}$ frame is a previous frame for the k$^{th}$ frame. The second baseline energy $N_{k-i-1}^{st}$ of environmental noise in the k−i−1$^{th}$ frame, may include signal energy in a previous frame. For example, when motion detector 260 determines that motion of the object is not detected in the k−1$^{th}$ frame and does not set the flag of object motion, e.g., $MF_{k-1}^{TD}=0$, environmental noise estimator 240 updates the second baseline energy $N_{k-1}^{st}$ by a similar weighted moving average: $N_{k-1}^{st}=\Sigma_{i=0}^{L-1}w_i N_{k-i-2}^{st}+w_{L-1}E\{_{x-1}^{2}(n)\}$, where $E\{_{k-1}^{2}(n)\}$ is the signal energy in the k−1$^{th}$ frame (that is considered as an environmental noise energy), which is a previous frame for the k$^{th}$ frame. In such an update, the second baseline energy $N_k^{st}$ is determined based on the weighted moving average of the signal energies at least in the k−1$^{th}$ and k$^{th}$ frames when motion of the object are not present in the frames.

In some embodiments, the second baseline energy $N_k^{st}$ is determined based on a plurality of Doppler signals received over a longer period than that of the first baseline energy $N_k$. For example, the second baseline energy $N_k^{st}$ can be determined based on a plurality of Doppler signals received over forty frames (those are considered as environmental noise energies), and the first baseline energy $N_k$ is averaged out over twenty frames.

Alternatively, the second baseline energy $N_k^{st}$ can be a stationary baseline energy that is average out over all of those frames in which motion detector 260 does not detect motion of person 110. The first baseline energy $N_k$ is a non-stationary baseline energy that is averaged out over the latest twenty of those frames in which motion detector 260 does not detect motion of person 110.

In some embodiments, method 500 is configured to detect presence of an inanimate object, a human, or an animal. Accordingly, step 510 includes receiving a Doppler signal from motion of an inanimate object, a human, or an animal during a frame, such as a moving vehicle, working person 110, or a cat walking in a room.

Figure 6:
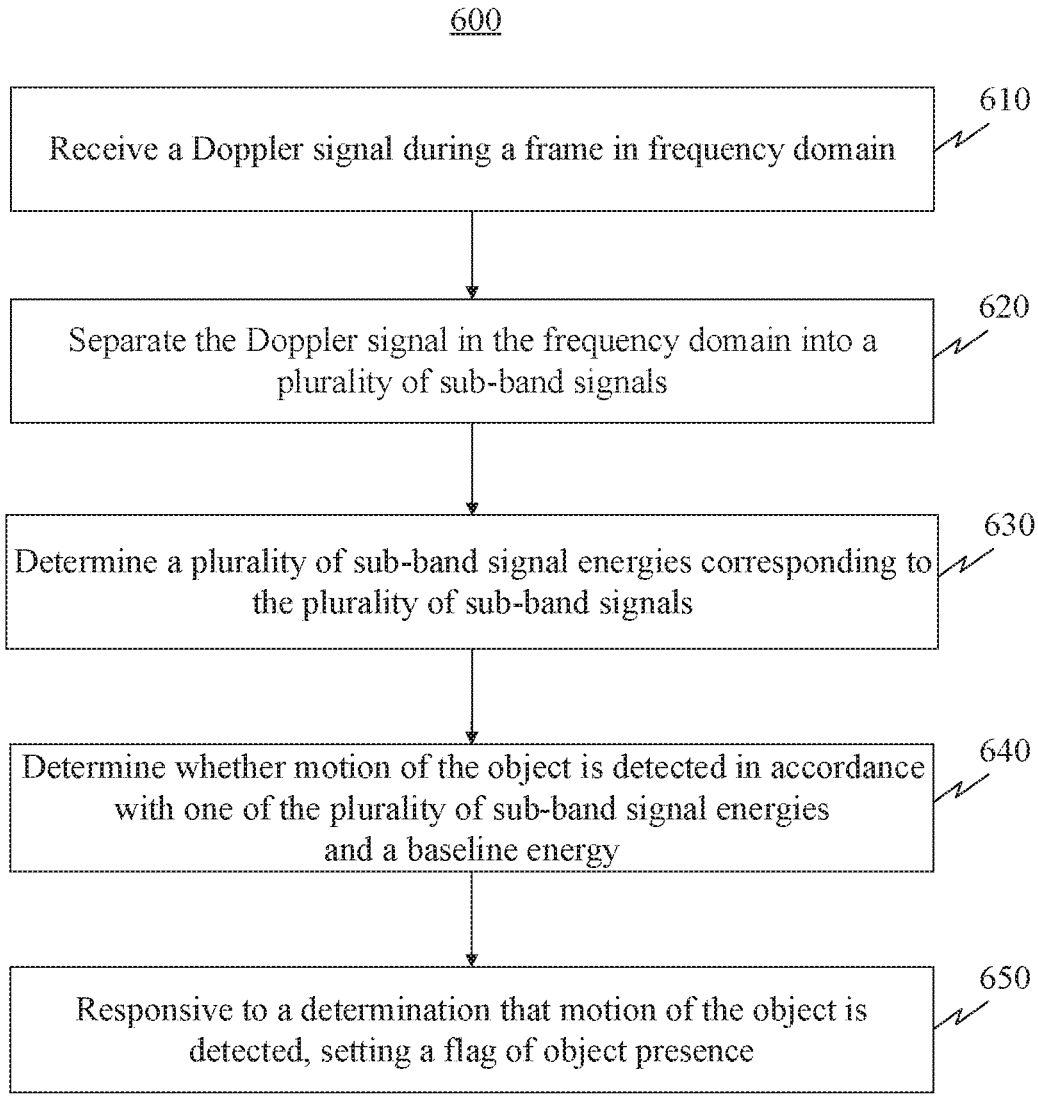
FIG. 6 is a flowchart of an exemplary method for detecting presence of an object in the frequency domain, according to some embodiments of the present disclosure.

FIG. 6 is a flowchart of an exemplary method 600 for detecting presence of an object in the frequency domain, according to some embodiments of the present disclosure. Method 600 may be practiced by object presence detector 100 and systems 300 and 400. Method 600 includes receiving a Doppler signal during a frame in the frequency domain (step 610), separating the Doppler signal in the frequency domain into a plurality of sub-band signals (step 620), determining a plurality of sub-band signal energies corresponding to the plurality of sub-band signals (step 630), determining whether motion of the object is detected in accordance with one of the plurality of sub-band signal energies and a baseline energy (step 640), and responsive to a determination that motion of the object is detected, setting a flag of object presence (step 650).

Step 610 includes receiving a Doppler signal during a frame in the frequency domain. For example, as shown in FIG. 3, after Fourier transformer 310 transforms the Doppler signal $x_k(n)$ in the time domain to a Doppler signal in the frequency domain $X_k(f)$, system 300 receives the Doppler signal $X_k(f)$ during a frame in the frequency domain, where k is an index of frames, f=0, 1, 2, . . . , Ns−1, and Ns is a number of samples in a frame.

Step 620 includes separating the Doppler signal in the frequency domain into a plurality of sub-band signals. For example, as system 300 illustrated in FIG. 3, sub-band decomposer 320 receives the Doppler signal $X_k(f)$ during a frame in frequency domain and separates the Doppler signal into five sub-band signals: $X_{k,m}(f)$, where m is an index of sub-bands and m=0, 1, 2, . . . , 4. The five sub-band signals are 0-50 Hz, 50-100 Hz, 100-150 Hz, 150-200, and 200-250 Hz. Sub-band decomposer 320 then sends the five sub-band signals $X_{k,m}(f)$ to sub-band motion detector 360.

Step 630 includes determining a plurality of sub-band signal energies corresponding to the plurality of sub-band signals. For example, as system 300 illustrated in FIG. 3, sub-band motion detector 360 receives five sub-band signals in the frequency domain $X_{k,m}(f)$ in the k$^{th}$ frame and determines signal energies of $X_{k,m}(f)$ in the frequency domain: $S_{k,m}=E\{X_{k,m}^{2}(f)\}=\Sigma_{f=0}^{Ns-1}X_{k,m}^{2}(f)$, where k is an index of frames, m is an index of sub-bands, f=0, 1, 2, . . . , Ns−1, and Ns is a number of samples in a frame. The determined sub-band signal energies $S_{k,m}$ corresponds to the five sub-band signals $X_{k,m}(f)$, where m=0, 1, 2, 3, and 4.

Step 640 includes determining whether motion of the object is detected in accordance with one of the plurality of sub-band signal energies and a baseline energy. For example, as system 300 illustrated in FIG. 3, sub-band motion detector 360 determines whether motion of person 110 is detected in accordance with sub-band signal energies $S_{k,m}$ and a baseline energy of environmental noise $N_{k-1}^{FD}$ in the k$^{th}$ frame as follows:

$$MF_{k,m}^{FD}=1 \text{ if } S_{k,m} \geq 2\beta N_{k-1}^{FD}, \text{ and}$$

$$MF_{k,m}^{FD}=0 \text{ if } S_{k,m} < 2\beta N_{k-1}^{FD},$$

where $MF_{k,m}^{FD}$ is a flag of sub-band object motion in the m$^{th}$ sub-band in the k$^{th}$ frame, $2\beta N_{k-1}^{FD}$ is a threshold of object motion detection, and $\beta=c \times SNRthr$, where c is a constant and SNRthr is an signal to noise ratio threshold.

When a sub-band signal energies $S_{k,m}$ is equal to or greater than the threshold $2N_{k-1}^{FD}$, sub-band motion detector 360 determines that motion of the object is detected and sets the flag of sub-band object motion, e.g., $MF_{k,m}^{FD}=1$. For example, when sub-band motion detector 360 determines that sub-band signal energy $S_{k,2}$ is greater than the threshold $2\beta N_{k-1}^{FD}$, sub-band motion detector 360 determines that motion of the object is detected in the sub-band and sets the flag of sub-band object motion, e.g., $MF_{k,2}^{FD}2=1$.

Step 650 includes, responsive to a determination that motion of the object is detected, setting a flag of object presence. For example, as system 300 illustrated in FIG. 3, when sub-band motion detector 360 determines whether motion of the object is detected in sub-bands in accordance with the threshold $2\beta N_{k-1}^{FD}$ or $2\beta N_{k-1,m}^{FD}$ and criteria thereof, object motion detector 380 determines that motion of the object is detected if one of five flags of sub-band objection motion is set, e.g., $MF_k^{FD}=1$ if $MF_{k,m}^{FD}=1$, where m=0, 1, 2, 3, or 4. For example, when $MF_{k,2}^{FD}=1$, object motion detector 380 determines that motion of the object is detected and sets $MF_k^{FD}=1$. When none of five flags of sub-band objection motion is set, object motion detector 380 determines that motion of the object is not detected and does not set the flag of object motion $MF_k^{FD}$.

After object motion detector 380 determines whether motion of the object is detected and accordingly, sets or does not set the flag of object motion $MF_k^{FD}$, object motion detector 380 sets a flag of object presence $OF_k^{FD}$ in accordance with the flag of object motion $MF_k^{FD}$. For example, object motion detector 380 sets: $OF_k^{FD}=MF_k^{FD}$.

In some embodiments, step 640 includes determining that motion of the object is detected when at least two of the plurality of sub-band signal energies are equal to or greater than a threshold, and determining that motion of the object is not detected when less than two of the plurality of sub-band signal energies is equal to or greater than the threshold, wherein the threshold is determined based on the baseline energy.

For example, as system 300 illustrated in FIG. 3, sub-band motion detector 360 determines whether motion of person 110 is detected in accordance with sub-band signal energies $S_{k,m}$ and a baseline energy $K_{k-1}^{FD}$ of environmental noise in the $k^{th}$ frame as follows:

$$MF_{k,m}^{FD}=1 \text{ if } S_{k,m} \geq \beta N_{k-1}^{FD}, \text{ and}$$

$$MF_{k,m}^{FD}=0 \text{ if } S_{k,m} < \beta N_{k-1}^{FD},$$

where $MF_{k,m}^{FD}$ is a flag of sub-band object motion in the $m^{th}$ sub-band in the $k^{th}$ frame, $\beta N_{k-1}^{FD}$ is a threshold of object motion detection, and $\beta=c \times SNRthr$, where c is a constant and SNRthr is a signal to noise ratio threshold.

When a sub-band signal energy $S_{k,m}$ is equal to or greater than the threshold $\beta N_{k-1}^{FD}$, sub-band motion detector 360 determines that motion of the object is detected in the sub-band and sets the flag of sub-band object motion, e.g., $MF_{k,m}^{FD}$, =1. For example, when sub-band motion detector 360 determines that sub-band signal energy $S_{k,1}$ is greater than the threshold $\beta N_{k-1}^{FD}$, sub-band motion detector 360 determines that motion of the object in the sub-band is detected and sets the flag of sub-band object motion, e.g., $MF_{k,1}^{FD}=1$. When sub-band motion detector 360 determines that sub-band signal energy $S_{k,2}$ is greater than the threshold $\beta N_{k-1}^{FD}$, sub-band motion detector 360 also determines that motion of the object is detected in the sub-band and sets the flag of sub-band object motion, e.g., $MF_{k,2}^{FD}=1$. When the remaining sub-band signal energies $S_{k,m}$ are less than the threshold $\beta N_{k-1}^{FD}$, sub-band motion detector 360 determines that motion of the object is not detected in the remaining sub-bands and does not set the flags of sub-band object motion, e.g., $MF_{k,m}^{FD}=0$, m=0, 3, and 4.

Object motion detector 380 determines that motion of the object is detected if at least two of five flags of sub-band objection motion are set, e.g., $MF_k^{FD}=1$ if $MF_{k,i}^{FD}=1$ and $MF_{k,j}^{FD}=1$, where i=0, 1, 2, 3, or 4, j=0, 1, 2, 3, or 4, and i≠j. For example, when $MF_{k,1}^{FD}=1$ and $MF_{k,2}^{FD}=1$, object motion detector 380 determines that motion of the object is detected and sets $MF_k^{FD}=1$. Alternatively, object motion detector 380 can determine that motion of the object is detected if two of five flags of sub-band objection motion in two adjacent sub-bands are set, e.g., $MF_k^{FD}=1$ if $MF_{k,i}^{FD}=1$ and $MF_{k,i+1}^{FD}=1$, where i=0, 1, 2, or 3. When only one or none of five flags of sub-band objection motion is set, object motion detector 380 determines that motion of the object is not detected and does not set $MF_k^{FD}$.

In some embodiments, step 610 includes receiving a Doppler signal in the time domain and transforming the Doppler signal in the time domain to the Doppler signal in the frequency domain using a short-time Fourier transform (STFT) or a filter bank. For example, as system 300 illustrated in FIG. 3, Fourier transformer 310 receives a Doppler signal $x_k(n)$ in the time domain and transforms the Doppler signal $x_k(n)$ in the time domain to a Doppler signal in frequency domain $X_k(f)$. Fourier transformer 310 can include a short-time Fourier transform (STFT) or a filter bank. Accordingly, Fourier transformer 310 transforms the Doppler signal in the time domain to the Doppler signal in the frequency domain using the STFT or the filter bank.

In some embodiments, the baseline energy of environmental noise includes a plurality of sub-band baseline energies corresponding to the plurality of sub-band signals, and step 640 includes determining whether motion of the object is detected in accordance with the plurality of sub-band signal energies and the plurality of sub-band baseline energies.

For example, as illustrated by system 300 in FIG. 3, environmental noise estimator 340 estimates environmental noises in respective sub-bands in the environment and average out sub-band baseline energies $N_{k-1,m}^{FD}$, where m=0, 1, 2, 3, and 4. Sub-band motion detector 360 determines whether motion of person 110 is detected in accordance with sub-band signal energies $S_{k,m}$ and a baseline energy $N_{k-1,m}^{FD}$ in the $k^{th}$ frame as follows:

$$MF_{k,m}^{FD}=1 \text{ if } S_{k,m} \geq 2\beta N_{k-1,m}^{FD}, \text{ and}$$

$$MF_{k,m}^{FD}=0 \text{ if } S_{k,m} < 2\beta N_{k-1,m}^{FD},$$

where $MF_{k,m}^{FD}$ is a flag of sub-band object motion in the $m^{th}$ sub-band in the $k^{th}$ frame, $2\beta N_{k-1,m}^{FD}$, is a threshold of object motion detection, and $\beta=c \times SNRthr$, where c is a constant and SNRthr is a signal to noise ratio threshold.

When a sub-band signal energy $S_{k,m}$ is equal to or greater than the threshold $2\beta N_{k-1,m}^{FD}$, sub-band motion detector 360 determines that motion of the object is detected and sets the flag of sub-band object motion, e.g., $MF_{k,m}^{FD}=1$. For example, when sub-band motion detector 360 determines that sub-band signal energy $S_{k,2}$ is greater than the threshold $2\beta N_{k-1,2}^{FD}$, sub-band motion detector 360 determines that motion of the object is detected in the sub-band and sets the flag of sub-band object motion, e.g., $MF_{k,2}^{FD}=1$. When a sub-band signal energy $S_{k,m}$ is less than the threshold $2\beta N_{k-1,m}^{FD}$, sub-band motion detector 360 determines that motion of the object is not detected in the sub-band and does not set the flag of sub-band object motion, e.g., $MF_{k,m}^{FD}=0$, m=0, 1, 3, and 4.

In some embodiments, responsive to a determination that motion of the object is not detected, method 600 further includes updating the baseline energy in accordance with the one of the plurality of sub-band signal energies. For example, when system 300 does not detect presence of an object in a frame, system 300 is configured to update sub-band baseline energies in accordance with received sub-band signal energies (that are considered as environmental sub-band noise energies) in this frame and the sub-band baseline energies. For example, environmental noise estimator 340 is configured to update the sub-band baseline energies by the weighted moving average: $N_{k,m} = \sum_{i=0}^{L-2} w_i N_{k-i-1,m}^{FD} + w_{L-1} E\{X_{k,m}^2(f)\}$, where $\sum_{i=0}^{L-1} w_i = 1$, $w_i$ is a weight of environmental noise energy of the $i^{th}$ frame in calculation of updated sub-band baseline energies, and $E\{X_{k,m}^2(f)\}$ are sub-band signal energies for m=0, 1, 2, 3, and 4.

In some embodiments, method 600 is configured to detect presence of an inanimate object, a human, or an animal. Accordingly, step 610 includes receiving a Doppler signal in the frequency domain that is from motion of an inanimate object, a human, or an animal during a frame, such as a moving vehicle, walking person 110, or a cat walking in a room.

Figure 7:
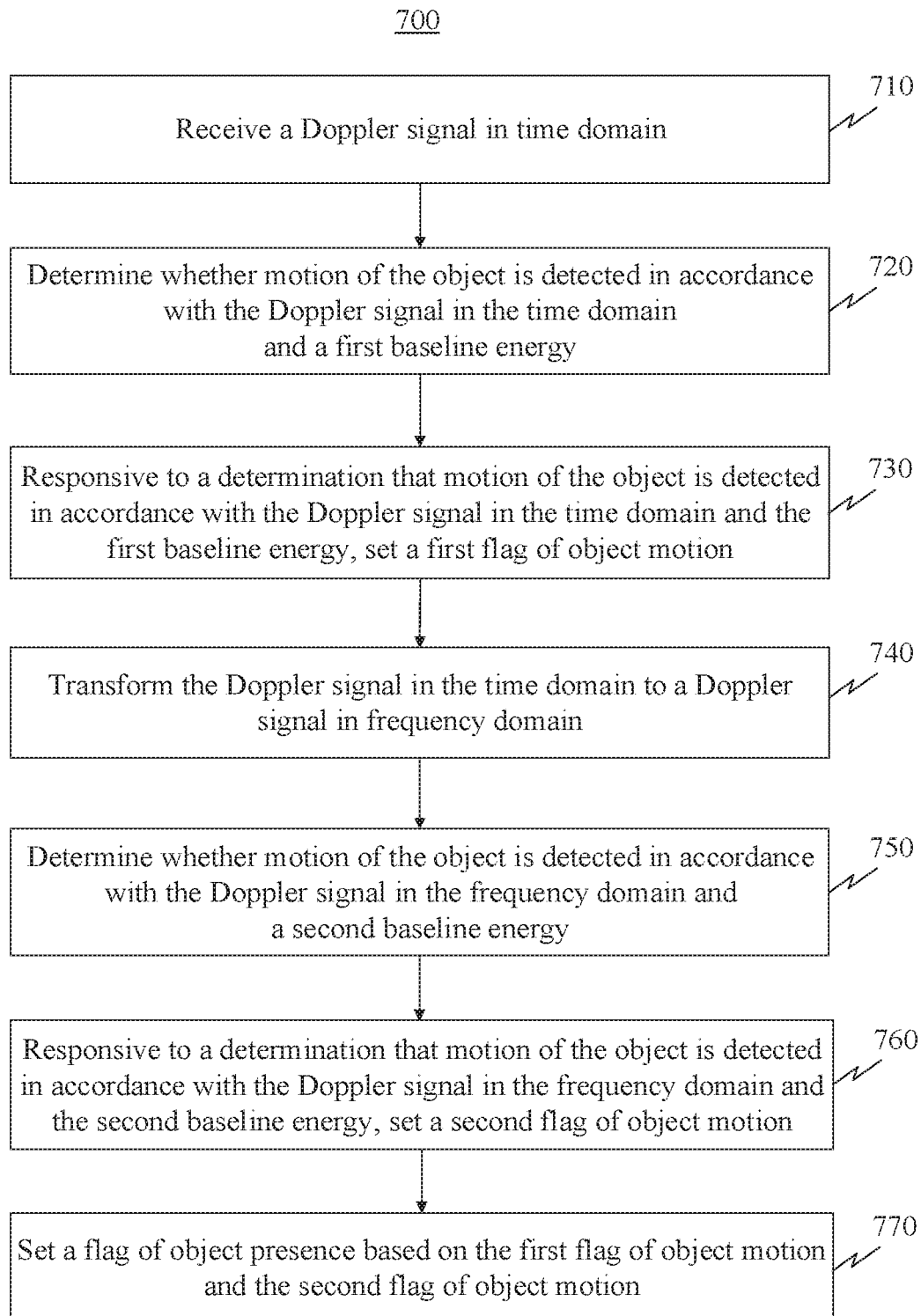
FIG. 7 is a flowchart of an exemplary method for detecting presence of an object in the time and frequency domains, according to some embodiments of the present disclosure.

FIG. 7 is a schematic diagram of an exemplary method 700 for detecting presence of an object in the time and frequency domains, according to some embodiments of the present disclosure. Method 700 may be practiced by object presence detector 100 and systems 200, 300 and 400. Method 700 includes receiving a Doppler signal in the time domain (step 710), determining whether motion of the object is detected in accordance with the Doppler signal in the time domain and a first baseline energy (step 720), responsive to a determination that motion of the object is detected in accordance with the Doppler signal in the time domain and the first baseline energy, setting a first flag of object motion (step 730), transforming the Doppler signal in the time domain to a Doppler signal in the frequency domain (step 740), determining whether motion of the object is detected in accordance with the Doppler signal in the frequency domain and a second baseline energy (step 750), responsive to a determination that motion of the object is detected in accordance with the Doppler signal in the frequency domain and the second baseline energy, setting a second flag of object motion (step 760), and setting a flag of object presence based on the first flag of object motion and the second flag of object motion (step 770).

Step 710 includes receiving a Doppler signal in time domain. For example, as illustrated by system 400 in FIG. 4, time-domain object motion detector 420 receives the Doppler signal $x_k(n)$ in the time domain, similar to operations of system 200 described above with respect to the methods shown in FIG. 2.

Step 720 includes determining whether motion of the object is detected in accordance with the Doppler signal in the time domain and a first baseline energy. For example, as system 400 illustrated in FIG. 4, time-domain object motion detector 420 determines whether motion of the object is detected in accordance with the Doppler signal $x_k(n)$ in the time domain and a baseline energy $N_{k-1}$, similar to operations of system 200 described above with respect to the methods shown in FIG. 2.

Step 730 includes, responsive to a determination that motion of the object is detected in accordance with the Doppler signal in the time domain and the first baseline energy, setting a first flag of object motion. For example, as system 400 illustrated in FIG. 4, time-domain object motion detector 420 sets a time-domain flag of object motion, $MF_k^{TD}=1$, as the first flag of object motion, in response to a determination that motion of the object is detected, similar to operations of system 200 described above with respect to the methods shown in FIG. 2.

Step 740 includes transforming the Doppler signal in the time domain to a Doppler signal in the frequency domain. For example, as system 400 illustrated in FIG. 4, frequency-domain object motion detector 430 transforms the Doppler signal $x_k(n)$ in the time domain to a Doppler signal $X_k(f)$ in the frequency domain, similar to operations of system 300 described above with respect to the methods shown in FIG. 3.

Step 750 includes determining whether motion of the object is detected in accordance with the Doppler signal in the frequency domain and a second baseline energy. For example, as system 400 illustrated in FIG. 4, frequency-domain object motion detector 430 determines whether motion of the object is detected in accordance with the Doppler signal $X_k(f)$ in the frequency domain and a baseline energy $N_{k-1}^{FD}$ or a sub-band baseline energy $K_{k-1,m}^{FD}$ similar to operations of system 300 described above with respect to the methods shown in FIG. 3.

Step 760 includes, responsive to a determination that motion of the object is detected in accordance with the Doppler signal in the frequency domain and the second baseline energy, setting a second flag of object motion. For example, as system 400 illustrated in FIG. 4, frequency-domain object motion detector 430 sets a frequency-domain flag of object motion, $MF_k^{FD}=1$, as the second flag of object motion, in response to a determination that motion of the object is detected, similar to operations of system 300 described above with respect to the methods shown in FIG. 3.

Step 770 includes setting a flag of object presence based on the first flag of object motion and the second flag of object motion. For example, as system 400 illustrated in FIG. 4, object presence detector 440 detects presence of the object and sets a flag of object presence, $OF_k$, based on the time-domain flag of object motion $MF_k^{TD}$ and the frequency-domain flag of object motion $MF_k^{FD}$.

In some embodiments, step 740 includes transforming the Doppler signal in the time domain to a Doppler signal in the frequency domain when a criterion is met. For example, as system 400 illustrated in FIG. 4, frequency-domain object motion detector 430 transforms the Doppler signal $x_k(n)$ in the time domain to a Doppler signal $X_k(f)$ in the frequency domain and proceeds with frequency-domain object motion detection when one of the following criteria is met:

(a) The time-domain flag $MF_k^{TD}$ is not set, e.g, $MF_k^{TD}=0$;
(b) The time-domain flag $MF_k^{TD}$ is set, e.g, $MF_k^{TD}=1$; or
(c) The time-domain flag $MF_k^{TD}$ is set, e.g, $MF_k^{TD}=1$, and a signal energy $s_k$ of the Doppler signal in the time domain is less than a threshold.

In accordance with the criterion (a), frequency-domain object motion detector 430 transforms the Doppler signal $x_k(n)$ in the time domain to a Doppler signal $X_k(f)$ in the frequency domain and proceeds with frequency-domain object motion detection when time-domain object motion detector 420 does not detect motion of the object in time domain.

In accordance with the criterion (b), frequency-domain object motion detector 430 transforms the Doppler signal $x_k(n)$ in the time domain to a Doppler signal $X_k(f)$ in the frequency domain and proceeds with frequency-domain object motion detection when time-domain object motion detector 420 detects motion of the object in the time domain. Thus, frequency-domain object motion detector 430 detects motion of the object only when time-domain object motion detector 420 detects motion of the object. Thus, time-domain object motion detector 420 and frequency-domain object motion detector 430 both detect motion of the object and send time-domain and frequency-domain flags of object motion to object presence detector 440.

In accordance with the criterion (c), frequency-domain object motion detector 430 transforms the Doppler signal $x_k(n)$ in the time domain to a Doppler signal $X_k(f)$ in frequency domain and proceeds with frequency-domain object motion detection when time-domain object motion detector 420 detects motion of the object in the time domain, but the signal energy $s_k$ of the Doppler signal in the time domain is less than a threshold, e.g., $s_k<1.2\beta N_{k-1}$. Thus, frequency-domain object motion detector 430 detects motion of the object when time-domain object motion detector 420 detects motion of the object, but the signal energy of the Doppler signal is not strong enough.

In some embodiments, method 700 is configured to detect presence of an inanimate object, a human, or an animal. Accordingly, step 710 includes receiving a Doppler signal from motion of an inanimate object, a human, or an animal during a frame, such as a moving vehicle, walking person 110, or a cat walking in a room.

Figure 8:
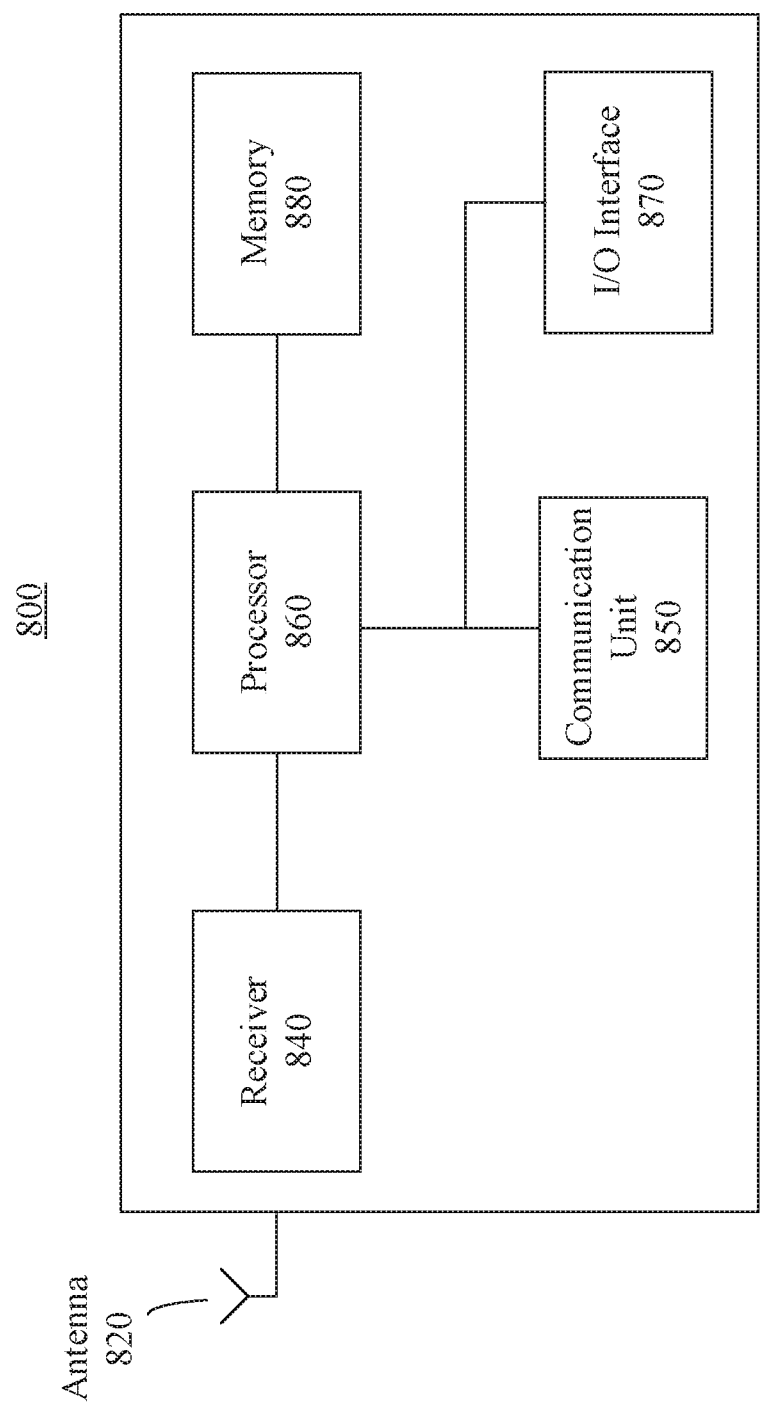
FIG. 8 is a schematic diagram of an exemplary apparatus for detecting presence of an object, according to some embodiments of the present disclosure.

FIG. 8 is a schematic diagram of an exemplary apparatus 800 for detecting presence of an object, according to some embodiments of the present disclosure. Object presence detector 100 as shown in FIG. 1 can be configured as apparatus 800. Apparatus 800 includes an antenna 820, a receiver 840, a communication unit 850, a processor 860, an I/O interface 870, and a memory 880. One or more of these elements of apparatus 800 may be included for detecting presence of an object in an environment. These elements may be configured to transfer data and send or receive instructions between or among each other. Antenna 120, receiver 140, and processor 160 as shown in FIG. 1 can be configured as antenna 820, receiver 840, and processor 860, respectively.

Processor 860 includes any appropriate type of general-purpose or special-purpose microprocessor, digital signal processor, or microcontroller. Processor 860 can be representative of one or more processors in object presence detector 100.

Memory 880 may include any appropriate type of mass storage provided to store any type of information that processor 860 may need to operate. Memory 880 may be a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 610 may be configured to store one or more programs for execution by processor 860 for detecting presence of an object in an environment, as disclosed herein.

Memory 880 may be further configured to store information and data used by processor 860. For instance, memory 880 may be configured to store received baseline energies of environmental noise therein for apparatus 800.

I/O interface 870 may be configured to facilitate communication between apparatus 800 and other apparatuses. For example, I/O interface 870 may receive a signal from another apparatus (e.g., a computer) including system configuration information for apparatus 800. I/O interface 870 may also output data of presence detection results to other apparatuses.

Communication unit 850 may include one or more cellular communication modules, including, for example, a 5G radio access system, a Long-Term Evolution (LTE), a High Speed Packet Access (HSPA), a Wideband Code-Division Multiple Access (WCDMA), a Global System for Mobile communication (GSM), a Bluetooth, and/or an Institute of Electrical and Electronics Engineers (IEEE) 802.11 or Wi-Fi communication module.

Antenna 820 may include one or more conductors (elements), electrically connected to receiver 840. During reception, oscillating electric and magnetic fields of an incoming radio wave exert force on the electrons in the antenna elements, causing them to move back and forth, creating oscillating currents in the antenna. Accordingly, antenna 820 can be configured to receive waves or signals in an environment.

Receiver 840 is configured to process the received waves or signals from antenna 820 for presence detection of an object. For example, receiver 840 can include an ADC to sample the received waves or signals from antenna 820 in accordance with a sampling rate, convert sampled signals to baseband signals, and feed results to processor 860. In some embodiments, receiver 840 can be further configured to perform operations of band-pass filter 220 shown in FIG. 2.

Processor 860 can be configured by one or more programs stored in memory 880 to perform operations of apparatus 800 described above with respect to the methods shown in FIGS. 1-7.

In some embodiments, the signal energies and/or the baseline energies in the methods shown in FIGS. 1-7 can be alternatively determined in terms of signal power and environmental noise power or in terms of another form of signal energy and environmental noise energy. For example, an alternative implementation of one of the methods shown in FIGS. 1-7 includes comparing signal power, baseline energy power, and one or more thresholds as operations described above with respect to those signal energies, baseline energies, and one or more thresholds of the methods shown in FIGS. 1-7.

Another aspect of the disclosure is directed to a non-transitory processor-readable medium storing instructions which, when executed, cause one or more processors to perform the methods discussed above. The processor-readable medium may include volatile or non-volatile, magnetic, semiconductor, tape, optical, removable, non-removable, or other types of processor-readable medium or processor-readable storage devices. For example, the processor-readable medium may be the storage device or the memory module having the processor instructions stored thereon, as disclosed. In some embodiments, the processor-readable medium may be a disc or a flash drive having the processor instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

What is claimed is:

1. A method for detecting presence of an object in an environment, the environment comprising an electromagnetic signal, the method comprising:
    determining a baseline energy in the environment in a previous frame;
    receiving a signal during a current frame, the received signal comprising the electromagnetic signal reflected from the object;
    filtering the received signal in a frequency band;
    determining a signal energy of the filtered signal;
    determining whether motion of the object is detected in accordance with the signal energy of the filtered signal and the baseline energy;
    responsive to a determination that motion of the object is detected in accordance with the signal energy of the filtered signal and the baseline energy, setting a flag of object presence; and
    responsive to a determination that motion of the object is not detected in accordance with the signal energy of the filtered signal and the baseline energy, updating the baseline energy in accordance with the signal energy.

2. The method of claim 1, wherein the determination that motion of the object is not detected in accordance with the signal energy of the filtered signal and the baseline energy includes:
    a first determination that motion of the object is not detected in accordance with the filtered signal in the time domain; and
    a second determination that motion of the object is not detected in accordance with the filtered signal in frequency domain.

3. The method of claim 1, wherein determining whether motion of the object is detected includes:
    determining that motion of the object is detected when the signal energy is equal to or greater than a threshold; or
    determining that motion of the object is not detected when the signal energy is less than the threshold, wherein the threshold is determined based on the baseline energy.

4. The method of claim 3, wherein the threshold is a first threshold, and the first threshold is determined based on the baseline energy and a second threshold.

5. The method of claim 1, wherein updating the baseline energy in accordance with the signal energy includes:
updating the baseline energy in accordance with a weighted average of the signal energy and the baseline energy.

6. The method of claim 1, wherein updating the baseline energy in accordance with the signal energy includes:
updating the baseline energy in accordance with the signal energy in the current frame and another signal energy in the previous frame.

7. The method of claim 1, wherein the baseline energy is determined based on a weighted moving average of a plurality of signal energies when motion of the object is not present.

8. The method of claim 1, wherein the baseline energy is a first baseline energy, and the method further comprises:
responsive to a determination that motion of the object is not detected, determining whether motion of the object is detected in accordance with the signal energy and a second baseline energy; and
responsive to a determination that motion of the object is detected in accordance with the signal energy and the second baseline energy, setting the flag of object presence.

9. The method of claim 8, wherein determining whether motion of the object is detected in accordance with the signal energy and the second baseline energy includes:
determining whether motion of the object is detected when the signal energy is equal to or greater than a threshold.

10. The method of claim 8, wherein determining whether motion of the object is detected in accordance with the signal energy and the second baseline energy includes:
determining that motion of the object is detected when the signal energy is equal to or greater than a threshold; or
determining that the motion of the object is not detected when the signal energy is less than the threshold,
wherein the threshold is determined based on the second baseline energy.

11. The method of claim 8, further comprising:
responsive to a determination that motion of the object is not detected in accordance with the signal energy and the second baseline energy, updating the second baseline energy in accordance with the signal energy.

12. The method of claim 8, wherein the second baseline energy is determined based on a weighted moving average of a plurality of signal energies when motion of the object is not present,
wherein the plurality of signal energies are energies of a plurality of electromagnetic signals received over a longer period than that of the first baseline energy.

13. The method of claim 1, wherein the presence of the object includes presence of an inanimate object, a human, or an animal.

14. An apparatus for detecting presence of an object in an environment, the environment comprising an electromagnetic signal, the apparatus comprising:
a memory storing instructions; and
a processor configured to execute the instructions to cause the apparatus to:
determine a baseline energy in the environment in a previous frame;
receive a signal during a current frame, the received signal comprising the electromagnetic signal reflected from the object;
filter the received signal in a frequency band;
determine a signal energy of the filtered signal;
determine whether motion of the object is detected in accordance with the signal energy of the filtered signal and the baseline energy;
responsive to a determination that motion of the object is detected in accordance with the signal energy of the filtered signal and the baseline energy, set a flag of object presence; and
responsive to a determination that motion of the object is not detected in accordance with the signal energy of the filtered signal and the baseline energy, update the baseline energy in accordance with the signal energy.

15. The apparatus of claim 14, wherein the determination that motion of the object is not detected in accordance with the signal energy of the filtered signal and the baseline energy includes:
a first determination that motion of the object is not detected in accordance with the filtered signal in the time domain; and
a second determination that motion of the object is not detected in accordance with the filtered signal in frequency domain.

16. The apparatus of claim 14, wherein the processor is configured to execute the instructions to cause the apparatus to determine whether motion of the object is detected by:
determining that motion of the object is detected when the signal energy is equal to or greater than a threshold; or
determining that motion of the object is not detected when the signal energy is less than the threshold,
wherein the threshold is determined based on the baseline energy.

17. The apparatus of claim 14, wherein the processor is configured to execute the instructions to cause the apparatus to update the baseline energy in accordance with the signal energy by:
updating the baseline energy in accordance with the signal energy in the current frame and another signal energy in the previous frame.

18. The apparatus of claim 14, wherein the baseline energy is determined based on a weighted moving average of a plurality of signal energies when motion of the object is not present.

19. The apparatus of claim 14, wherein the baseline energy is a first baseline energy, and the processor is further configured to execute the instructions to cause the apparatus to:
responsive to a determination that motion of the object is not detected, determine whether motion of the object is detected in accordance with the signal energy and a second baseline energy; and
responsive to a determination that motion of the object is detected in accordance with the signal energy and the second baseline energy, set the flag of object presence.

20. A non-transitory processor-readable medium storing instructions that are executable by one or more processors of an apparatus to perform a method for detecting presence of an object in an environment, the environment comprising an electromagnetic signal, the method comprising:
determining a baseline energy in the environment in a previous frame;
receiving a signal during a current frame, the received signal comprising the electromagnetic signal reflected from the object;

filtering the received signal in a frequency band;
determining a signal energy of the filtered signal;
determining whether motion of the object is detected in accordance with the signal energy of the filtered signal and the baseline energy;
responsive to a determination that motion of the object is detected in accordance with the signal energy of the filter signal and the baseline energy, setting a flag of object presence; and
responsive to a determination that motion of the object is not detected in accordance with the signal energy of the filtered signal and the baseline energy, updating the baseline energy in accordance with the signal energy.

\* \* \* \* \*